United States Patent
Kim et al.

(10) Patent No.: US 11,637,648 B2
(45) Date of Patent: Apr. 25, 2023

(54) APPARATUS AND METHOD FOR SUPPORTING CHANGEABLE COMMUNICATION SPEED IN WIRELESS POWER TRANSMISSION SYSTEM

(71) Applicant: LG ELECTRONICS INC., Seoul (KR)

(72) Inventors: Jaeyeol Kim, Seoul (KR); Hyoungseok Kim, Seoul (KR); Yongcheol Park, Seoul (KR); Dohyeon Son, Seoul (KR); Jinho Youn, Seoul (KR); Seonghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/272,768

(22) PCT Filed: Sep. 3, 2019

(86) PCT No.: PCT/KR2019/011335
§ 371 (c)(1),
(2) Date: Mar. 2, 2021

(87) PCT Pub. No.: WO2020/050592
PCT Pub. Date: Mar. 12, 2020

(65) Prior Publication Data
US 2021/0320745 A1 Oct. 14, 2021

(30) Foreign Application Priority Data

Sep. 6, 2018 (KR) .................. 10-2018-0106632

(51) Int. Cl.
*H04L 1/00* (2006.01)
*H02J 50/80* (2016.01)
(Continued)

(52) U.S. Cl.
CPC .............. *H04L 1/0002* (2013.01); *H02J 7/02* (2013.01); *H02J 50/12* (2016.02); *H02J 50/80* (2016.02);
(Continued)

(58) Field of Classification Search
CPC ....... H04L 1/0002; H04L 1/203; H04L 69/24; H02J 50/80; H02J 50/12; H02J 7/02; H02J 50/40
See application file for complete search history.

(56) References Cited

U.S. PATENT DOCUMENTS

2010/0210296 A1* 8/2010 Kawaji ............... H04W 52/346
455/522
2015/0319778 A1* 11/2015 Folke ..................... H04L 5/001
370/330
(Continued)

FOREIGN PATENT DOCUMENTS

KR 20140050517 4/2014
KR 20140113147 9/2014
(Continued)

OTHER PUBLICATIONS

PCT International Application No. PCT/KR2019/011335, International Search Report dated Dec. 11, 2019, 4 pages.

*Primary Examiner* — Janice N Tieu
(74) *Attorney, Agent, or Firm* — Lee Hong Degerman Kang & Waimey

(57) ABSTRACT

The present disclosure relates to an apparatus and a method for supporting an improved communication speed in a wireless power transmission system. In such present specification, provided is the method comprising the steps of: transmitting at least one data packet to a wireless power reception apparatus; receiving, from the wireless power reception apparatus, a first request packet requesting a change in a communication speed of the wireless power (Continued)

transmission apparatus; and changing the communication speed of the wireless power transmission apparatus on the basis of the first request packet, and transmitting, at the changed communication speed, a first response packet in response to the first request packet to the wireless power reception apparatus.

6 Claims, 18 Drawing Sheets

(51) Int. Cl.
    *H02J 50/40*     (2016.01)
    *H04L 69/24*     (2022.01)
    *H02J 50/12*     (2016.01)
    *H02J 7/02*     (2016.01)
    *H04L 1/20*     (2006.01)

(52) U.S. Cl.
    CPC .............. *H04L 1/203* (2013.01); *H02J 50/40* (2016.02); *H04L 69/24* (2013.01)

(56) References Cited

U.S. PATENT DOCUMENTS

2016/0274229 A1*   9/2016  Oh ........................ G01S 19/24
2020/0374723 A1*  11/2020  Zheng ................. H04W 24/00

FOREIGN PATENT DOCUMENTS

| KR | 20170138271 | 12/2017 |
| KR | 20180075342 | 7/2018 |
| KR | 20180081950 | 7/2018 |

* cited by examiner

FIG. 10

| Preamble | ZERO | Response | Type | Info | Parity |
|----------|------|----------|------|------|--------|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

APPARATUS AND METHOD FOR SUPPORTING CHANGEABLE COMMUNICATION SPEED IN WIRELESS POWER TRANSMISSION SYSTEM

CROSS-REFERENCE TO RELATED APPLICATIONS

This application is the National Stage filing under 35 U.S.C. 371 of International Application No. PCT/KR2019/011335, filed on Sep. 3, 2019, which claims the benefit of earlier filing date and right of priority to KR Application No. 10-2018-0106632, filed on Sep. 6, 2018, the contents of which is incorporated by reference herein in its entirety.

BACKGROUND OF THE DISCLOSURE

Field of the Disclosure

The present disclosure relates to wireless charging and, more particularly, to an apparatus and method capable of increasing and decreasing a communication speed in a wireless power transmission system.

Related Art

Wireless power transmission technology is a technology that transmits electrical power without wires between a power source and an electronic device. As one example, the wireless power transmission technology allows the battery of a wireless terminal such as a smartphone or tablet to be charged simply by placing the wireless terminal on a wireless charging pad, thereby providing better mobility, convenience, and safety than the existing wired charging environment using a wired charging connector. The wireless power transmission technology is getting great attention as a means to replace the existing wired power transmission environment not only for wireless charging of wireless terminals but also for various other applications including electric vehicle, wearable device such as Bluetooth earphones or 3D glasses, home appliance, furniture, underground facility, building, medical device, robot, and leisure.

Wireless power transmission is also called contactless power transmission, no point of contact power transmission, or wireless charging. A wireless power transmission system may comprise a wireless power transmitter providing electrical energy through a wireless power transmission method and a wireless power receiver receiving electrical energy transmitted wirelessly from the wireless power transmitter and supplying power to a power receiving device such as a battery cell.

The wireless power transmission technology encompasses various methods such as a method for transmitting power through magnetic coupling, method for transmitting power through radio frequency (RF), method for transmitting power through microwaves, and method for transmitting power through ultrasonic waves. Magnetic coupling based methods are further divided into magnetic induction and magnetic resonance methods. The magnetic induction method transmits energy by using currents induced in a receiver-side coil due to the magnetic field generated at a transmitter-side coil battery cell according to electromagnetic coupling between the transmitter-side coil and the receiver-side coil. The magnetic resonance method is similar to the magnetic induction method in that it uses a magnetic field. However, the magnetic resonance method is different from the magnetic induction method in that resonance is generated when a specific resonant frequency is applied to the transmitter-side and receiver-side coils; and energy is transferred as a magnetic field is concentrated due to the generated resonance at both ends of the transmitter and receiver-sides.

In a wireless power transmission system, in general, amplitude shift keying (ASK) using a magnetic field change or frequency shift keying (FSK) using a frequency change is used for communication between a wireless power transmission apparatus and a wireless power reception apparatus. However, the communication using ASK and FSK is not suitable for middle power class transmission or the transmission of a large amount of data such as authentication, which is necessary for an advanced wireless power transmission system, because the communication has a transmission speed of only several kHz and is vulnerable to electrical/magnetic disturbance. Accordingly, in order to cover various applications of wireless power transmission, there is a need for a wireless power transmission apparatus, reception apparatus, and method supporting an improved communication speed.

SUMMARY

The present disclosure provides an apparatus and method for supporting an enhanced communication speed in a wireless power transmission system.

The present disclosure also provides an apparatus and method capable of transmitting and receiving frequency shift keying (FSK) data at various communication speeds.

The present disclosure also provides an apparatus and method capable of adaptively adjusting an FSK communication speed.

According to an aspect of the present disclosure, there is provided a communication method of a wireless power transmission apparatus. The method includes transmitting at least one data packet to a wireless power reception apparatus, receiving, from the wireless power reception apparatus, a first request packet to request a change in the communication speed of the wireless power transmission apparatus, and changing the communication speed of the wireless power transmission apparatus based on the first request packet and transmitting a first response packet for the first request packet to the wireless power reception apparatus at the changed communication speed.

In one aspect, transmitting the first response packet may be performed in at least one of a negotiation phase, a power transfer phase, and a renegotiation phase related to the transmission of wireless power.

In another aspect, the first request packet may include a speed increase request packet to indicate an increase in the communication speed and a speed decrease request packet to indicate a decrease in the communication speed.

In still another aspect, transmitting the first response packet at the changed communication speed may include changing the number of cycles per bit (n) used to transmit one bit in an operating frequency for the transmission of wireless power based on the first request packet, aligning each bit of data with the n cycles, and changing the operating frequency between differential bi-phases based on a value of each bit during the n cycles.

In still another aspect, the method may further include receiving, from the wireless power reception apparatus, a second request packet to request a change in the communication speed based on whether a reception error occurs in the first response packet and increasing or decreasing the number of cycles per bit (n) by a preset number based on the second request packet, after transmitting the first response packet at the changed communication speed.

In still another aspect, the method may further include receiving, from the wireless power reception apparatus, a renegotiation request packet for a change in the communication speed, after transmitting the data packet.

According to another aspect of the present disclosure, there is provided a communication method of a wireless power reception apparatus. The method includes receiving at least one data packet from a wireless power transmission apparatus, calculating a reception error rate for data transmitted by the wireless power transmission apparatus by decoding the at least one data packet, transmitting, to the wireless power transmission apparatus, a first request packet to request a change in the communication speed of the wireless power transmission apparatus based on the reception error rate, and decoding a first response packet for the first request packet received from the wireless power transmission apparatus based on the changed communication speed.

In one aspect, decoding the first response packet may be performed in at least one of a negotiation phase, a power transfer phase, and a renegotiation phase related to the transmission of wireless power.

In another aspect, the first request packet may include a speed increase request packet to indicate an increase in the communication speed and a speed decrease request packet to indicate a decrease in the communication speed. Transmitting the first request packet may include transmitting the speed increase request packet when the reception error rate is a threshold or less, and transmitting the speed decrease request packet when the reception error rate is higher than the threshold.

In still another aspect, decoding the first response packet may include detecting n cycles aligned with each bit of the first response packet in an operating frequency based on the number of cycles per bit (n) previously negotiated with the wireless power transmission apparatus, and detecting a transition phase of the operating frequency during the n cycles.

In still another aspect, the method may further include transmitting, to the wireless power transmission apparatus, a second request packet to request a change in the communication speed based on a result of the decoding of the first response packet, after decoding the first response packet.

In still another aspect, the method may further include transmitting a renegotiation request packet for a change in the communication speed to the wireless power transmission apparatus when the reception error rate is higher than the threshold, after calculating the reception error rate.

Advantageous Effects

Various applications for wireless power transmission can be supported because a transmission speed of FSK data can be adaptively adjusted based on communication channel quality between the wireless power transmission apparatus and the wireless power reception apparatus, a power class of each apparatus, and/or an operation phase.

BRIEF DESCRIPTION OF THE DRAWINGS

FIG. 10 illustrates a structure of a sync pattern according to one embodiment.

DESCRIPTION OF EXEMPLARY EMBODIMENTS

The term "wireless power" used hereinafter refers to energy of arbitrary form related to electric, magnetic, and electromagnetic fields transferred from a wireless power transmitter to a wireless power receiver without using physical electromagnetic conductors. Wireless power may be called a wireless power signal and may refer to the oscillating magnetic flux enclosed by the primary and secondary coils. For example, this document describes power conversion in a system for charging devices including a mobile phone, cordless phone, iPod, MP3 player, and headset wirelessly. In general, the basic principles of wireless power transfer include power transfer through magnetic coupling, power transfer through radio frequency (RF), power transfer through microwaves, and power transfer through ultrasonic waves.

Figure 1:
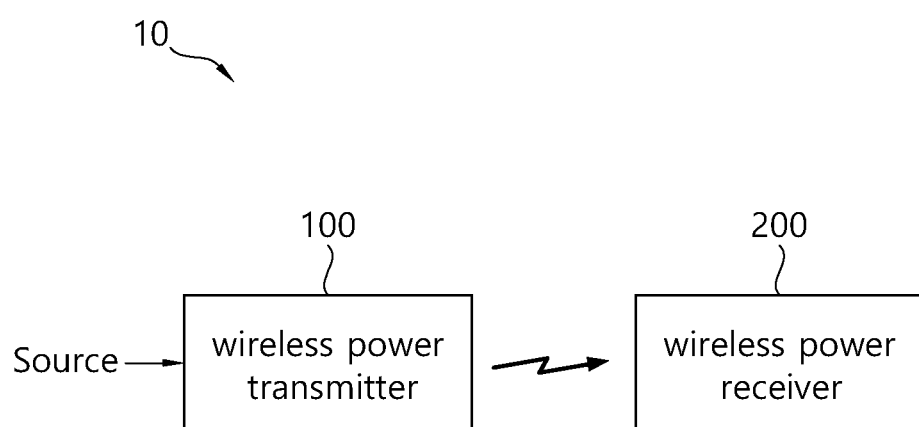
FIG. 1 illustrates a block diagram of a wireless power transmission system 10 according to one embodiment.
Figure 2:
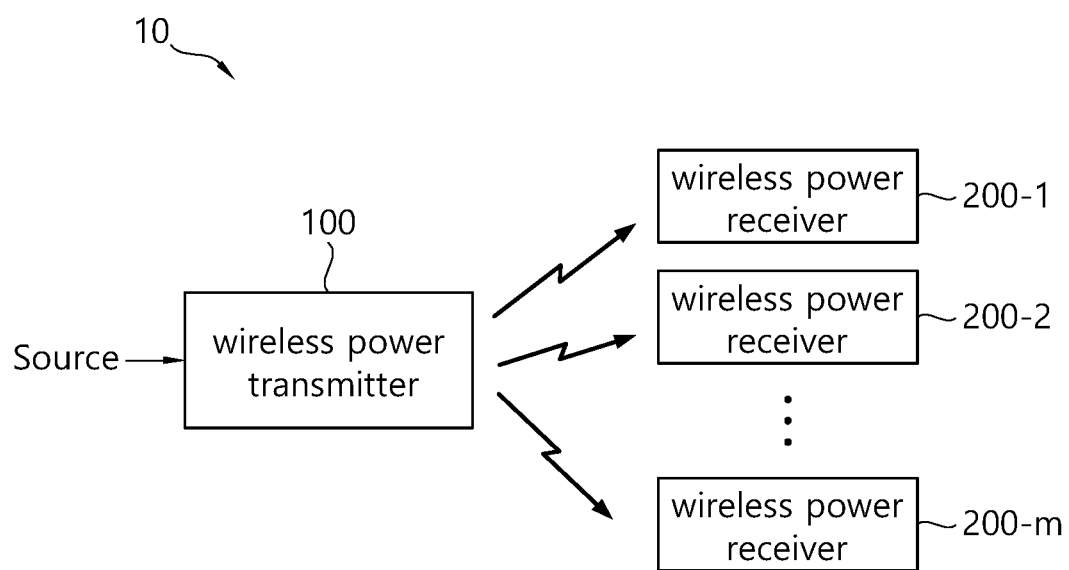
FIG. 2 illustrates a block diagram of a wireless power transmission system 10 according to another embodiment.

FIG. 1 illustrates a block diagram of a wireless power transmission system 10 according to one embodiment, and FIG. 2 illustrates a block diagram of a wireless power transmission system 10 according to another embodiment.

Referring to FIG. 1, the wireless power transmission system 10 includes a wireless power transmitter 100 and a wireless power receiver 200.

The wireless power transmitter 100 receives power from an external power source S and generates a magnetic field. The wireless power receiver 200 receives power wirelessly by generating currents by using the generated magnetic field.

Also, the wireless power transmitter 100 and the wireless power receiver 200 in the wireless power transmission system 10 may transmit and receive various pieces of information required for wireless power transfer. Here, communication between the wireless power transmitter 100 and the wireless power receiver 200 may be performed according to either in-band communication using a magnetic field used for wireless power transfer or out-band communication using a separate communication carrier. Out-band communication may also be called out-of-band communication. In what follows, the terms are unified as out-band communication. Examples of out-band communication include NFC, Bluetooth, and Bluetooth Low Energy (BLE).

Here, the wireless power transmitter 100 may be provided as a fixed or mobile type. Examples of fixed type transmitter include transmitters embedded in the indoor ceiling or wall or furniture such as a table; installed in the form of an implant in an outdoor parking lot, bus stop or subway station; or installed in a transportation means such as a vehicle or a train. The mobile type wireless power transmitter 100 may be implemented as a mobile device with a portable weight or size or as part of another device such as a cover of a notebook computer.

The wireless power receiver 200 should be construed as a comprehensive concept including various types of electronic devices equipped with a battery and various home appliances driven by receiving power wirelessly rather than through a power cable. Typical examples of the wireless power receiver 200 include a portable terminal, cellular phone, smart phone, Personal Digital Assistant (PDA), Portable Media Player (PMP), Wibro terminal, tablet, phablet, notebook, digital camera, navigation terminal, television, electric vehicle (EV) and drone, and the like.

In the wireless power transmission system 10, the number of wireless power receiver 200 may be one or plural. Although FIG. 1 illustrates a case where the wireless power transmitter 100 and the wireless power receiver 200 transmit and receive power one-to-one, it is also possible that one wireless power transmitter 100 transmits power to a plurality of wireless power receivers 200-1, 200-2, . . . , 200-M. In particular, when wireless power transmission is conducted through a magnetic resonance scheme, one wireless power transmitter 100 may transmit power to multiple wireless power receivers 200-1, 200-2, . . . , 200-M simultaneously by applying a simultaneous transmission scheme or a time-division transmission scheme.

Also, although FIG. 1 illustrates a case where the wireless power transmitter 100 transmits power directly to the wireless power receiver 200, a separate transceiver such as a relay or repeater for increasing the wireless power transmission range may be introduced between the wireless power transmitter 100 and the wireless power receiver 200. In this case, power is transmitted from the wireless power transmitter 100 to the wireless power transceiver, and the wireless power transceiver again transmits power to the wireless power receiver 200.

In what follows, a wireless power receiver, power receiver, and receiver mentioned in the present specification refer to the wireless power receiver 200. Also, a wireless power transmitter, power transmitter, and transmitter mentioned in the present specification refer to the wireless power transmitter 100.

Figure 3:
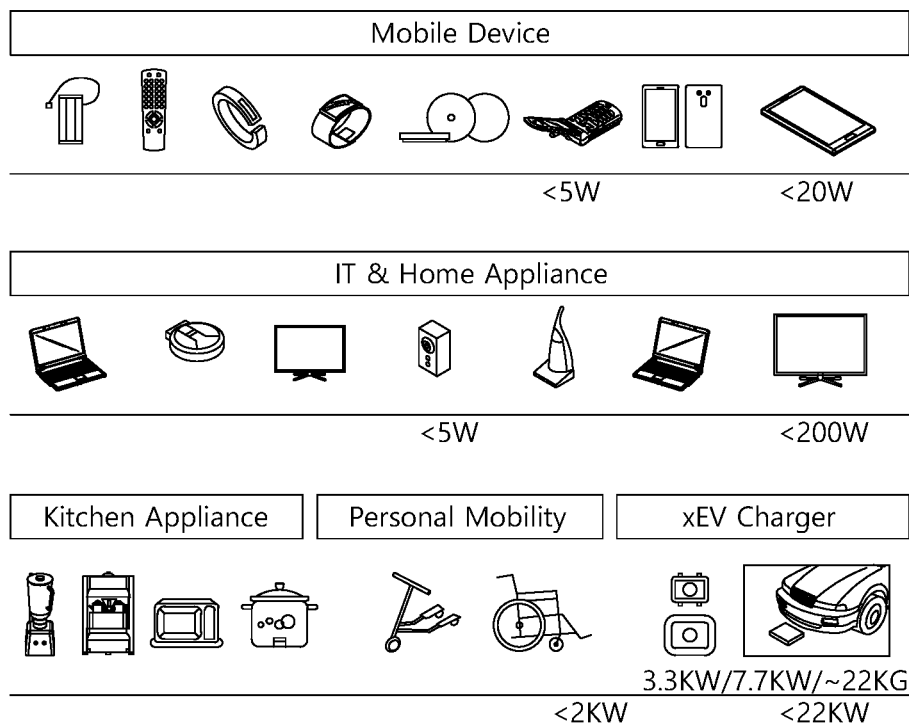
FIG. 3 illustrates examples of various electronic devices where a wireless power transmission system is employed.

FIG. 3 illustrates examples of various electronic devices where a wireless power transmission system is employed, and FIG. 3b illustrates one example of WPC NDEF in a wireless power transmission system.

FIG. 3 illustrates electronic devices categorized according to the amount of power transmitted and received in a wireless power transmission system. Referring to FIG. 3, a small power (smaller than about 5 W or 20 W) wireless charging scheme may be applied to wearable devices such as a smart watch, smart glasses, Head Mounted Display (HMD), and smart ring; and mobile electronic devices (or portable electronic devices) such as an earphone, remote controller, smart phone, PDA, and tablet PC.

A medium power (smaller than about 50 W or 200 W) wireless charging scheme may be applied to medium-size/small-sized home appliances such as a notebook computer, robot vacuum cleaner, TV, audio device, vacuum cleaner, monitor, drone, and the like. A high power (small than about 2 kW or 22 kW) wireless charging scheme may be applied to kitchen appliances such as a blender, microwave oven, and electric rice cooker; and personal mobility devices (or electric device/mobility means) such as a wheelchair, electric kickboard, electric bicycle, and electric vehicle.

The electronic devices/mobility means described above (or shown in FIG. 1) may each include a wireless power receiver to be described later. Therefore, the aforementioned electronic devices/mobility means may be charged by receiving power wirelessly from a wireless power transmitter.

In what follows, descriptions are given with respect to a mobile device to which a wireless power charging scheme is applied, which is, however, only an example; a wireless charging method according to the present disclosure may be applied to various electronic devices described above.

Wireless power transmitters and wireless power receivers may provide very convenient user experience and interface (UX/UI). In other words, a smart wireless charging service may be provided. A smart wireless charging service may be implemented based on the UX/UI of the smart phone including a wireless power transmitter. To implement the application, an interface between the processor of the smart phone and the wireless power receiver allows "drop and play" two-way communication between the wireless power transmitter and receiver.

As one example, a user may experience a smart wireless charging service at a hotel. If the user comes into a hotel room and places his or her smart phone on a wireless charger in the room, the wireless charger transmits wireless power to the smart phone, and the smart phone receives wireless power. During this process, the wireless charger transmits, to the smart phone, information about a smart wireless charging service. If the smart phone detects that it is placed on the wireless charger, detects reception of wireless power, or receives information about the smart wireless charging service from the wireless charger, the smart phone enters a state in which it asks the user to opt-in into an additional feature. To this purpose, the smart phone may display a message on the screen with or without an alarm sound. One example of the message may include sentences such as "Welcome to ### hotel. Select "Yes" to activate smart charging functions: Yes|No Thanks". The smart phone receives a user input selecting Yes or No Thanks and performs the next procedure selected by the user. If Yes is selected, the smart phone transmits the corresponding information to the wireless charger. And the smart phone and the wireless charger perform the smart charging function together.

The smart wireless charging service may also include receiving auto-filled WiFi credentials. For example, the wireless charger transmits the WiFi credentials to the smart phone, and the smart phone automatically inputs the WiFi credentials received from the wireless charger by executing an appropriate app.

The smart wireless charging service may also include executing a hotel application that provides a hotel promotion or obtaining remote check-in/check-out and contact information.

As another example, the user may experience the smart wireless charging service inside a vehicle. If the user gets into the vehicle and places a smart phone on a wireless charger, the wireless charger transmits wireless power to the smart phone, and the smart phone receives wireless power. During this process, the wireless charger transmits information about the smart wireless charging service to the smart phone. If the smart phone detects that it is placed on the wireless charger, detects reception of wireless power, or receives information about the smart wireless charging service from the wireless charger, the smart phone enters a state in which it inquires the user about the identity.

In this state, the smart phone is automatically connected to the vehicle via WiFi and/or Bluetooth. the smart phone may display a message on the screen with or without an alarm sound. One example of the message may include sentences such as "Welcome to your car. Select "Yes" to synch device with in-car controls: Yes|No Thanks". The smart phone receives a user input selecting Yes or No Thanks and performs the next procedure selected by the user. If Yes is selected, the smart phone transmits the corresponding information to the wireless charger. And by executing in-vehicle application/display software, the smart phone and wireless charger may perform the in-vehicle smart control function together. The user may enjoy desired music and check a regular map position. The in-vehicle application/display software may include a function that provides synchronized access for passersby.

As yet another example, the user may experience smart wireless charging at home. If the user enters a room and places his or her smart phone on a wireless charger in the room, the wireless charger transmits wireless power to the smart phone, and the smart phone receives wireless power. During this process, the wireless charger transmits, to the smart phone, information about a smart wireless charging service. If the smart phone detects that it is placed on the wireless charger, detects reception of wireless power, or receives information about the smart wireless charging service from the wireless charger, the smart phone enters a state in which it asks the user to opt-in into an additional feature. To this purpose, the smart phone may display a message on the screen with or without an alarm sound. One example of the message may include sentences such as "Hi xxx, Would you like to activate night mode and secure the building?: Yes|No Thanks". The smart phone receives a user input selecting Yes or No Thanks and performs the next procedure selected by the user. If Yes is selected, the smart phone transmits the corresponding information to the wireless charger. The smart phone and the wireless charger may at least recognize the user pattern and recommend the user to lock doors and windows, turn off lights, or set an alarm.

Standards related to wireless power transmission include those developed by the Wireless Power Consortium (WPC), Air Fuel Alliance (AFA), and Power Matters Alliance (PMA).

WPC standards define baseline power profile (BPP) and extended power profile (EPP). BPP is related to a wireless power transmitter and a wireless power receiver which support 5 W power transmission, and EPP is related to a wireless power transmitter and a wireless power receiver which support transmission of power in the range larger than 5 W and less than 30 W.

Various wireless power transmitters and receivers using different power levels are dealt with by the respective standards and classified into different power classes or categories.

For example, the WPC classifies wireless power transmitters and receivers in terms of power class (PC)-1, PC0, PC1, and PC2; and provides standard specifications for the respective PCs. The PC-1 standard is related to wireless power transmitters and receivers that provide guaranteed power less than 5 W. Applications of the PC-1 include wearable devices such as smart watches.

The PC0 standard is related to wireless power transmitters and receivers providing guaranteed power of 5 W. The PC0 standard includes the EPP in which guaranteed power reaches up to 30 W. Although in-band (IB) communication is a mandatory communication protocol for the PC0 class, out-band (OOB) communication, which is used as a backup channel of the option, may also be used. A wireless power receiver may determine whether OOB is supported by setting an OOB flag within a configuration packet. A wireless power transmitter supporting the OOB may enter the OOB handover phase by transmitting a bit-pattern for OOB handover as a response to the configuration packet. The response to the configuration packet may be NAK, ND, or a newly defined 8-bit pattern. Applications of the PC0 include smart phones.

The PC1 standard is related to wireless power transmitter and receivers providing guaranteed power ranging from 30 W to 150 W. OOB is a mandatory communication channel for the PC1 class, and IB is used for initialization and link establishment toward OOB. A wireless power transmitter may enter the OOB handover phase by transmitting a bit-pattern for OOB handover as a response to the configuration packet. Applications of the PC1 include lap-top computers or power tools.

The PC2 standard is related to wireless power transmitter and receivers providing guaranteed power ranging from 200 W to 2 kW, applications of which include kitchen appliances.

As described above, PCs may be distinguished according to the power level, and whether to support compatibility within the same PC may be set as optional or mandatory. Here, compatibility within the same PC indicates that power transmission and reception is possible within the same PC. For example, if a wireless power transmission of PC x is able to charge a wireless power receiver in the same PC x, it may be regarded that compatibility is maintained within the same PC. Similarly to the case above, compatibility between different PCs may also be supported. Here, compatibility between different PCs indicates that power transmission and reception is possible between different PCs. For example, if a wireless power transmitter of PC x is able to charge a wireless power receiver in PC y, it may be regarded that compatibility is maintained between different PCs.

Support of compatibility between PCs is a very important issue from a perspective of user experience and infrastructure development. However, maintaining compatibility between PCs cause various technical problems as follows.

In the case of compatibility within the same PC, for example, a wireless power receiver based on a lap-top charging scheme capable of providing reliable charging only when power is transmitted continuously may run into a problem in receiving power reliably from a wireless power transmitter based on a power tool scheme that transmits power discontinuously. Also, in the case of compatibility between different PCs, for example, when a wireless power transmitter of which the minimum guaranteed power is 200 W transmits power to a wireless power receiver of which the maximum guaranteed power is 5 W, there is a risk that the wireless power receiver is damaged due to overvoltage. As a result, it is difficult to take the PC as an indicator/reference that represents/indicates compatibility.

In what follows, 'profile' will be newly defined as an indicator/reference that represents/indicates compatibility. In other words, it may be construed that compatibility is maintained among wireless power transmitters and wireless power receivers having the same 'profile' to enable stable power transmission and reception whereas power transmission and reception is impossible among wireless power transmitters and wireless power receivers having different 'profiles'. The profile may be defined according to compatibility and/or application regardless of (or independently of) power class.

The profiles may be divided largely into three cases: i) mobile and computing, ii) power tool, and iii) kitchen.

Or, the profiles may be divided largely into four cases: i) mobile, ii) power tool, iii) kitchen, and iv) wearable profile.

'In the case of 'mobile' profile, PC may be defined as PC0 and/or PC1; communication protocol/scheme as IB and OOB; and operating frequency ranges from 87 kHz to 205 kHz, where examples of application include smart phones and lap-top computers.

In the case of 'power tool' profile, PC may be defined as PC1; communication protocol/scheme as IB; and operating frequency ranges from 87 kHz to 145 kHz, where examples of application include power tools.

In the case of 'kitchen' profile, PC may be defined as PC2; communication protocol/scheme as NFC-based; and operating frequency is less than 100 kHz, where examples of application include kitchen or home appliances.

In the case of power tool and kitchen profiles, NFC communication may be employed between a wireless power transmitter and a wireless power receiver. By exchanging WPC NFC Data Exchange Profile Format (NDEF), the wireless power transmitter and the wireless power receiver may confirm that they are NFC devices applied to WPC wireless power devices. For example, the WPC NDEF may include application profile field (for example, IB), version field (for example, IB), and profile specific data (for example, IB). The application profile field indicates whether the corresponding apparatus uses i) mobile and computing, ii) power tool, or iii) kitchen profile; upper nibble of the version field indicates the major version; and lower nibble of the version field indicates the minor version. Also, the profile specific data defines contents for kitchen.

In the case of 'wearable' profile, PC may be defined as PC-1; communication protocol/scheme as IB; and operating frequency ranges from 87 kHz to 205 kHz, where examples of application include wearable devices worn on the user's body.

Maintaining compatibility may be mandatory in the same profile, but optional between different profiles.

The profiles described above (mobile profile, power tool profile, kitchen profile, and wearable profile) may be generalized to first to n-th profiles, and new profiles may be added to/substituted for old profiles according to the WPC specification and embodiments.

In case profiles are defined as described above, a wireless power transmitter may perform power transmission selectively only to the wireless power receiver of the same profile as the wireless power transmitter, thereby enabling more stable power transmission. Also, since the burden on the wireless power transmitter is reduced, and power transmission to incompatible wireless power receivers is not attempted, the risk of damaging a wireless power receiver is reduced.

The PC1 in the 'mobile' profile may be defined by borrowing an optional extension such as OOB based on the PC0 while, in the case of 'power tool' profile, it may be defined simply as a modified version of the PC1 'mobile' profile. Also, until now, the wireless transmission technology has been defined in an attempt to maintain compatibility within the same profile; however, in the future, it may be further developed in a direction of maintaining compatibility between different profiles.

The AFA standard refers to a wireless power transmitter as a Power Transmitting Unit (PTU) and refers to a wireless power receiver as a Power Receiving Unit (PRU). PTUs are classified into a plurality of classes as shown in Table 1, and PRUs are classified into a plurality of categories as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{Tx\_IN\_MAx}$ of the corresponding class. The PRU cannot draw a power that is higher than the power level specified in the corresponding category.

Figure 4:
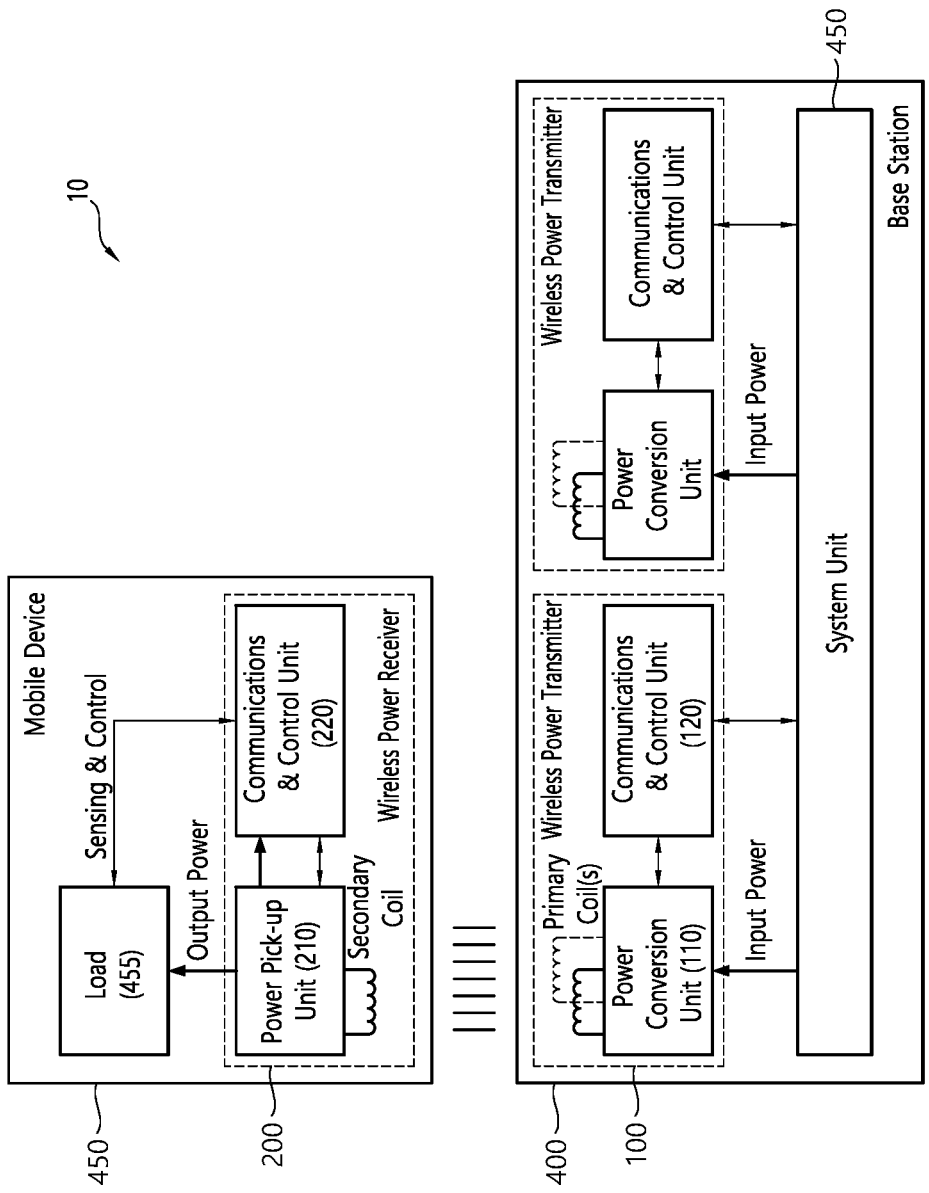
FIG. 4 illustrates a block diagram of a wireless power transmission system according to another embodiment.

FIG. 4 illustrates a block diagram of a wireless power transmission system according to another embodiment.

Referring to FIG. 4, the wireless power transmission system 10 includes a mobile device 450 receiving power wirelessly and a base station 400 transmitting power wirelessly.

The base station 400 provides inductive power or resonant power and may include at least one wireless power transmitter 100 and a system unit 405. The wireless power transmitter 100 may transmit inductive or resonant power and control transmission. The wireless power transmitter 100 may include a power conversion unit 110 that converts electric energy to a power signal by generating a magnetic field through the primary coil(s) and a communication & control unit 120 that controls communication with the wireless power receiver 200 and power transmission so that power may be transmitted at an appropriate level. The system unit 405 may perform control of input power provisioning, control of a plurality of wireless power transmitters, and control of other operation of the base station such as user interface control.

The primary coil may generate an electromagnetic field by using AC power (or voltage or current). The primary coil may receive AC power (or voltage or current) at a particular frequency output from the power conversion unit 110 and generate a magnetic field at the particular frequency. The magnetic field may be generated in a non-radial or radial direction, and the wireless power receiver 200 receive the magnetic field to generate a current. In other words, the primary coil transmits power wirelessly.

In the magnetic induction method, the primary and secondary coils may have arbitrarily suitable shapes; for example, the coils may be realized by copper wires wound around a high permeability member such as ferrite or amorphous metal. The primary coil may also be called primary core, primary winding, or primary loop antenna. Meanwhile, the secondary coil may also be called secondary core, secondary winding, secondary loop antenna, or pickup antenna.

When the magnetic resonance method is used, the primary and secondary coils may be provided in the form of a primary resonant antenna and a secondary resonant antenna. A resonant antenna may have a resonance structure including a coil and a capacitor. At this time, the resonant frequency of the resonant antenna is determined by the inductance of the coil and capacitance of the capacitor. Here, the coil may be formed to have a loop shape. Also, a core may be disposed inside the loop. The core may include a physical core such as a ferrite core or an air core.

Energy transfer between the primary resonant antenna and the secondary resonant antenna may be achieved through the resonance phenomenon of a magnetic field. Resonance is a phenomenon in which high efficiency energy transfer occurs between two resonant antennas when one of the two resonant antennas generates a near field corresponding to the resonant frequency, the other resonant antenna is located in the vicinity of the field generating antenna, and the two resonant antennas are coupled to each other. If a magnetic field corresponding to the resonant frequency is generated between the first and the second resonant antennas, a phenomenon that the first and the second resonant antennas resonate to each other occurs; accordingly, the magnetic field is concentrated towards the secondary resonant antenna with a higher efficiency than a normal case in which the magnetic field generated at the first resonant antenna is radiated into the free space; and thereby energy may be transferred from the first resonant antenna to the secondary resonant antenna with high efficiency. The magnetic induction method may be implemented similarly to how the magnetic resonance method is implemented; however, in this case, the frequency of the magnetic field doesn't have to be the resonant frequency. Instead, in the magnetic induction method, matching is needed between the loops forming the primary and the secondary coils, and spacing between the loops has to be very close.

Although not shown in the figure, the wireless power transmitter 100 may further include a communication antenna. The communication antenna may transmit and receive a communication signal by using a communication carrier in addition to magnetic field communication. For example, the communication antenna may transmit and receive a communication signal based on WiFi, Bluetooth, Bluetooth LE, ZigBee, or NFC.

The communications & control unit (120) may transmit and/or receive information to and from the wireless power receiver (200). The communications & control unit (120) may include at least one of an IB communication module and an OOB communication module.

The TB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OOB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OOB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OOB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

Referring to FIG. 4, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Hereinafter, the coil or coil unit includes a coil and at least one device being approximate to the coil, and the coil or coil unit may also be referred to as a coil assembly, a coil cell, or a cell.

Figure 5:
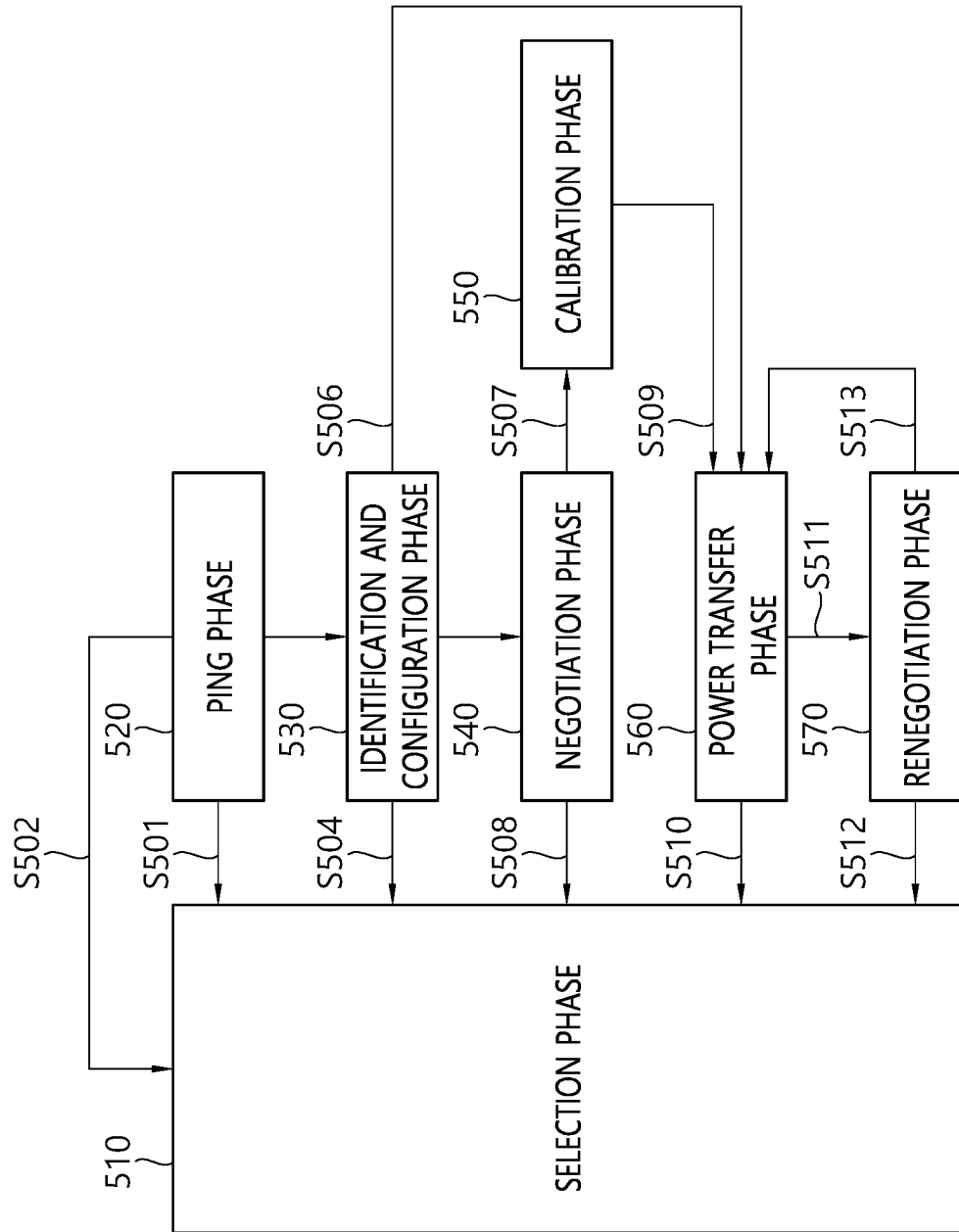
FIG. 5 is a state transition diagram illustrating a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) the wireless power receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the wireless power receiver, the process may be shifted back to the selection phase (510).

If the ping phase (520) is completed, the wireless power transmitter may shift to the identification and configuration phase (530) for identifying the wireless power receiver and for collecting configuration and status information of the wireless power receiver.

In the identification and configuration phase 530, if an unexpected packet is received, an expected packet is not received for a predetermined period of time (time out), a transmission error occurs, or no power transfer contact is set, the wireless power transmitter may transition to the selection phase 510.

The wireless power transmitter may check whether transition to the negotiation phase 540 is needed based on a negotiation field value of a configuration packet received in the identification and configuration phase 530. If it is turned out from the checking result that a negotiation is needed, the wireless power transmitter may enter the negotiation phase 540 and perform a predetermined Foreign Object Detection (FOD) procedure. On the other hand, if it is found from the checking result that a negotiation is not needed, the wireless power transmitter may immediately transition to the power transfer phase 560.

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase 560, if an unexpected packet is received, an expected packet is not received for a predetermined period of time (time out), preset power transfer contract violation occurs, or charging is completed, the wireless power transmitter may transition to the selection phase 510.

Also, in the power transfer phase 560, if a power transfer contract needs to be reconfigured depending on a state change of the wireless power transmitter, the wireless power transmitter may transition to the renegotiation phase 570. At this time, if renegotiation is completed normally, the wireless power transmitter may return to the power transfer phase 560.

The power transfer contract may be set based on state and characteristics information of the wireless power transmitter and the wireless power receiver. For example, the state information of the wireless power transmitter may include information about a maximum transmissible power amount, information about the maximum number of wireless power receivers that may be accommodated, and so on and the state information of the wireless power receiver may include information about required power and so on.

Figure 6:
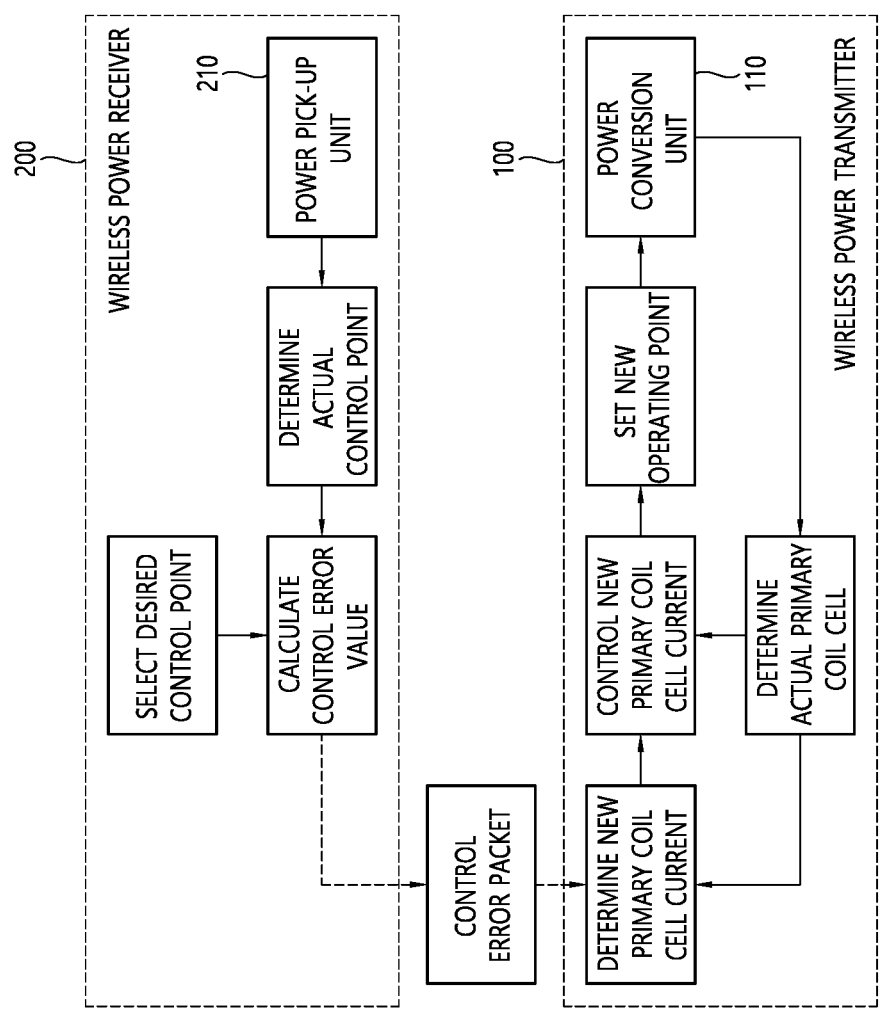
FIG. 6 illustrates a power control method according to one embodiment.

FIG. 6 illustrates a power control method according to one embodiment.

Referring to FIG. 6, in the power transfer phase, the wireless power transmitter 100 and the wireless power receiver 200 may control the amount of power transferred by performing power transfer and communication at the same time. The wireless power transmitter and the wireless power receiver operate at a specific control point. The control point represents a combination of voltage and current provided at the output of the wireless power receiver when power transfer is performed.

To describe in more detail, the wireless power receiver selects a desired control point—desired output current/voltage, temperature at a specific position on a mobile device, and so on—and additionally determines an actual control point currently operating. The wireless power receiver may calculate a control error value by using the desired control point and the actual control point and transmit the calculated control error value to the wireless power transmitted through a control error packet.

And the wireless power transmitter may configure/control a new operating point—amplitude, frequency, and duty cycle—and control power transfer by using the received control error packet. Therefore, the control error packet is transmitted/received at regular time intervals in the power transfer phase, and as an embodiment, if the wireless power receiver attempts to reduce the current of the wireless power transmitter, the wireless power receiver may transmit the control error value by setting the control error value to a negative value while, if the wireless power receiver attempts to increase the current, the control error value may be transmitted after being set to a positive value. In this way, in the induction mode, the wireless power receiver may control power transfer by transmitting the control error packet to the wireless power transmitter.

In the resonance mode to be described below, power transfer may be conducted differently from the induction mode. In the resonance mode, one wireless power transmitter should be able to serve a plurality of wireless power receivers simultaneously. However, when power transfer is controlled as in the induction mode, since transferred power is controlled by communication with one wireless power receiver, it may be difficult to control power transfer for additional wireless power receivers. Therefore, in the resonance mode according to the present disclosure, a wireless power transmitter transmits basic power commonly to wireless power receivers, and a wireless power receiver may control the amount of received power by controlling its own resonant frequency. However, even in the resonance mode, the method described with reference to FIG. 6 is not completely excluded; rather, control of additional transmission power may be performed according to the method of FIG. 6.

Figure 7:
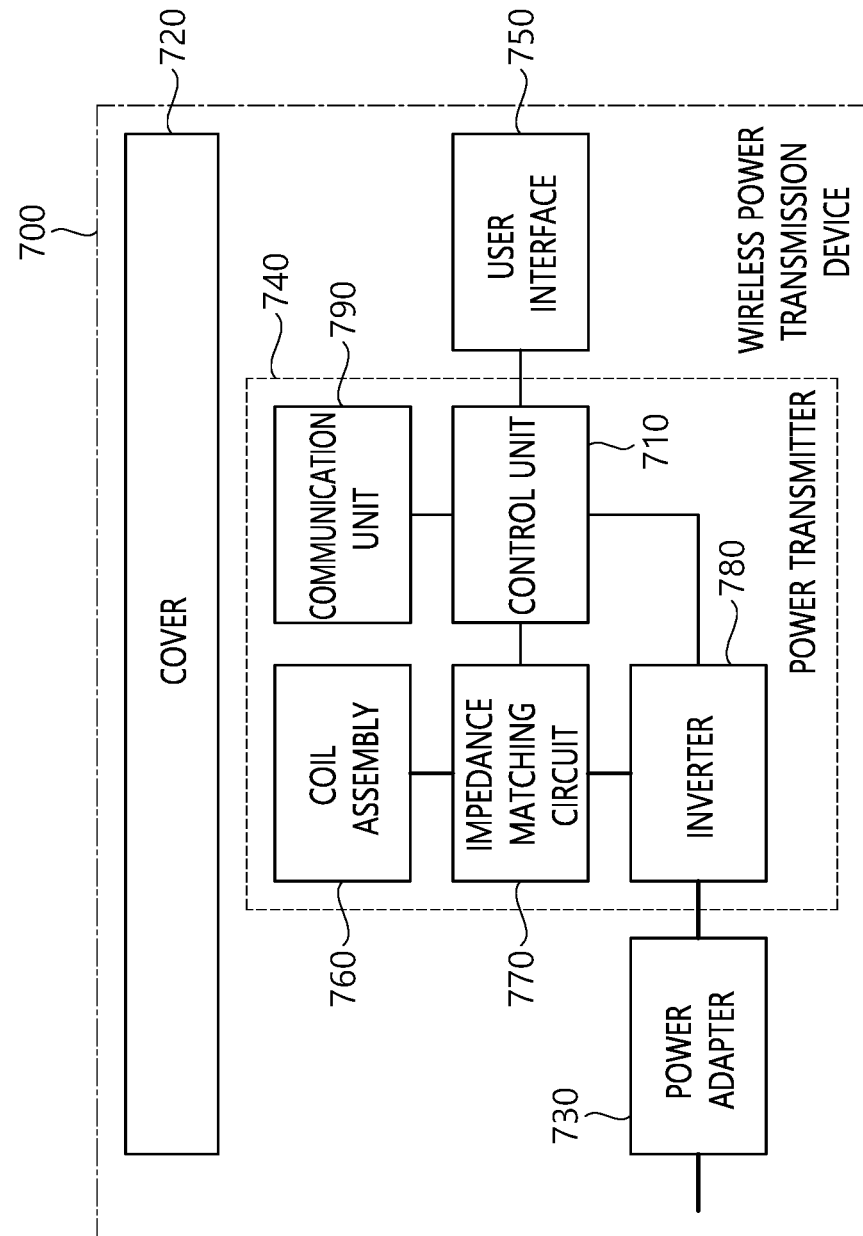
FIG. 7 illustrates a block diagram of a wireless power transmitter according to another embodiment.

FIG. 7 illustrates a block diagram of a wireless power transmitter according to another embodiment. The block diagram may belong to a wireless power transmission system in the magnetic resonance method or shared mode. The shared mode may refer to a mode in which wireless power transmitters and receivers perform one-to-many communication and charging. The shared mode may be implemented by using the magnetic induction method or resonance method.

Referring to FIG. 7, the wireless power transmitter 700 may include at least one of a cover 720 covering a coil assembly, power adaptor 730 supplying power to a power transmitter 740, power transmitter 740 transmitting wireless power, or user interface 750 providing information about progress of power transfer and other related matters. In particular, the user interface 750 may be optionally included or included as another user interface 750 of the wireless power transmitter (700).

The power transmitter 740 may include at least one of a coil assembly 760, impedance matching circuit 770, inverter 780, communication unit 790, or control unit 710.

The coil assembly 760 includes at least one primary coil generating a magnetic field and may be referred to as a coil cell.

The impedance matching circuit 770 provides impedance matching between the inverter and the primary coil(s). The impedance matching circuit 770 may generate resonance at a frequency suitable for boosting the primary coil current. In the multi-coil power transmitter 740, the impedance matching circuit may additionally include a multiplexer which routes a signal to a subset of the primary coils at the inverter. The impedance matching circuit may also be referred to as a tank circuit.

The impedance matching circuit 770 may include capacitors, inductors, and switching elements that switch connections among capacitors and inductors. Matching of impedance may be performed by detecting a reflected wave of wireless power transmitted through the coil assembly 760 and adjusting a connected state of a capacitor or an inductor by switching the switching element based on the reflected wave or by adjusting capacitance of a capacitor or by adjusting inductance of an inductor. Depending on the needs, the impedance matching circuit 770 may be omitted, and the present specification also includes an embodiment of the wireless power transmitter 700 in which the impedance matching circuit 770 is omitted.

The inverter 780 may convert an DC input to an AC signal. The inverter 780 may be driven in a half-bridge or full-bridge structure to generate a pulse wave and duty cycle of an adjustable frequency. Also, the inverter may include a plurality of stages to adjust an input voltage level.

The communication unit 790 may perform communication with a power receiver. The power receiver performs load modulation to communicate a request and information with a power transmitter. Therefore, the power transmitter 740 may monitor amplitude and/or phase of a current and/or voltage of the primary coil by using the communication unit 790 to demodulate data transmitted from the power receiver.

Also, the power transmitter 740 may control output power to transmit data through the communication unit 790 by using the Frequency Shift Keying (FSK) scheme.

The control unit 710 may control communication and power transfer of the power transmitter 740. The control unit 710 may control power transfer by adjusting the aforementioned operating point. The operating point may be determined, for example, by at least one of the operating frequency, duty cycle, and input voltage.

The communication unit 790 and control unit 710 may be implemented by separate units/elements/chipsets or by a single unit/element/chipset.

Figure 8:
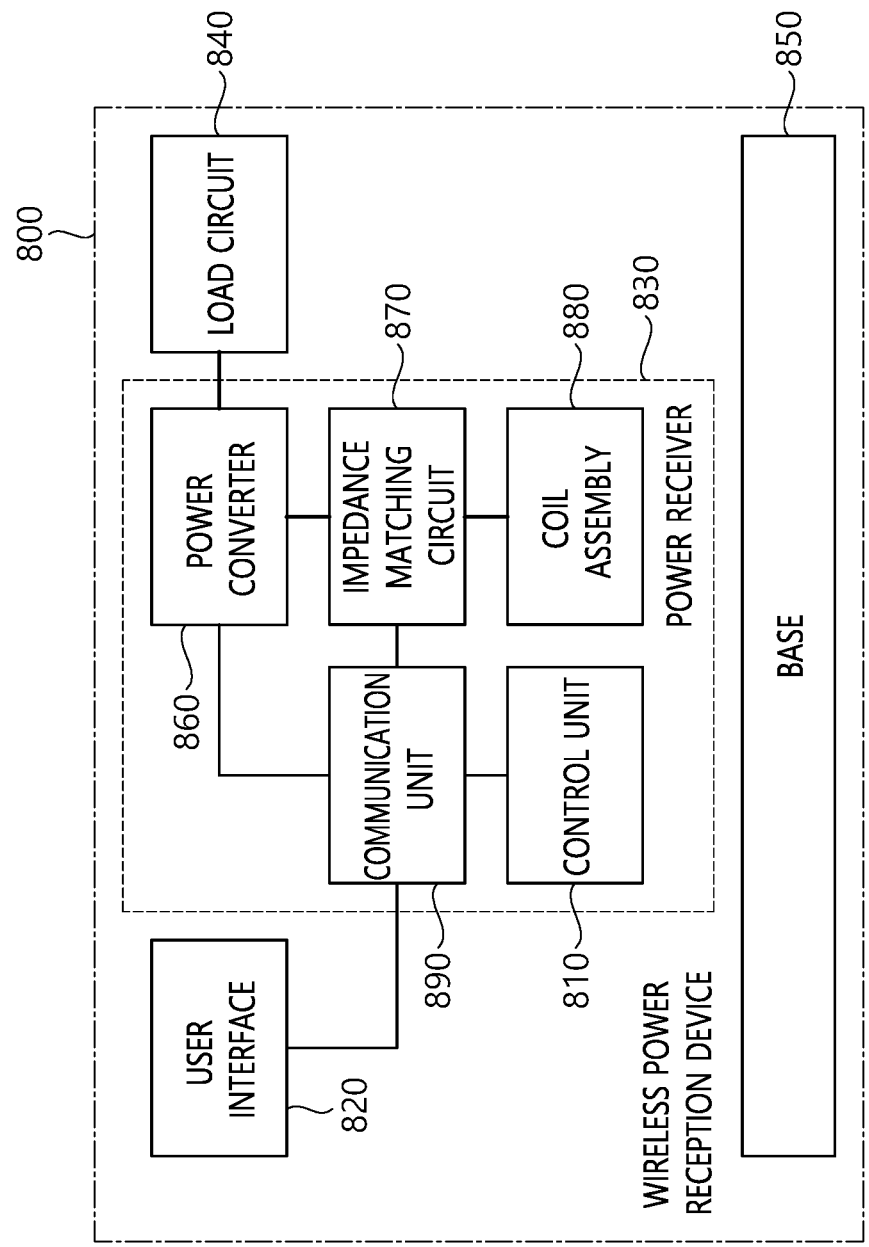
FIG. 8 illustrates a block diagram of a wireless power receiver according to another embodiment.

FIG. 8 illustrates a block diagram of a wireless power receiver according to another embodiment. The block diagram may belong to a wireless power transmission system in the magnetic resonance method or shared mode.

In FIG. 8, the wireless power receiver 800 may include at least one of a user interface 820 providing information about progress of power transfer and other related matters; power receiver 830 receiving wireless power; and base 850 supporting and covering a load circuit 840 or coil assembly. In particular, the user interface 820 may be optionally included or included as another user interface 820 of power reception equipment.

The power receiver 830 may include at least one of a power converter 860, impedance matching circuit 870, coil assembly 880, communication unit 890, or control unit 810.

The power converter 860 may convert AC power received from the secondary coil into voltage and current suitable for the load circuit. As an embodiment, the power converter 860 may include a rectifier. The rectifier rectifies received wireless power and converts an AC signal to a DC signal. The rectifier may convert an AC signal to a DC signal by using a diode or transistor and smooth the converted signal by using a set of capacitors and resistors. Rectifiers may be implemented by using full-wave rectification based on a bridge circuit, half-wave rectification, or voltage multiplication. In addition, the power converter may adapt to the reflected impedance of the power receiver.

The impedance matching circuit 870 may provide impedance matching between a combination of the power converter 860 and the load circuit 870 and the secondary coil. As an embodiment, the impedance matching circuit may generate resonance around 100 kHz which may reinforce power transfer. The impedance matching circuit 870 may include capacitors, inductors, and switching elements that switch between combinations thereof. Matching of impedance may be performed by controlling switching elements constituting the impedance matching circuit 870 based on the voltage, current, power, and frequency value of received wireless power. Depending on the needs, the impedance matching circuit 870 may be omitted, and the present specification also includes an embodiment of the wireless power receiver 200 in which the impedance matching circuit 870 is omitted.

The coil assembly 80 may include at least one secondary coil and optionally further include an element which shields a metallic part of the receiver against a magnetic field.

The communication unit 890 may perform load modulation to communicate a request and information with a power transmitter.

To this purpose, the power receiver 830 may switch resistors or capacitors to change the reflected impedance.

The control unit 810 may control received power. To this purpose, the control unit 810 may determine/calculate a difference between an actual operating point and a desired operating point of the power receiver 830. And the control unit 810 may adjust/reduce the difference between an actual operating point and a desired operating point by performing adjustment of reflected impedance of the power transmitter and/or fulfilling the operating point adjustment request of the power transmitter. When this difference is minimized, optimal power reception may be performed.

The communication unit 890 and control unit 810 may be implemented by separate units/elements/chipsets or by a single unit/element/chipset.

Figure 9:
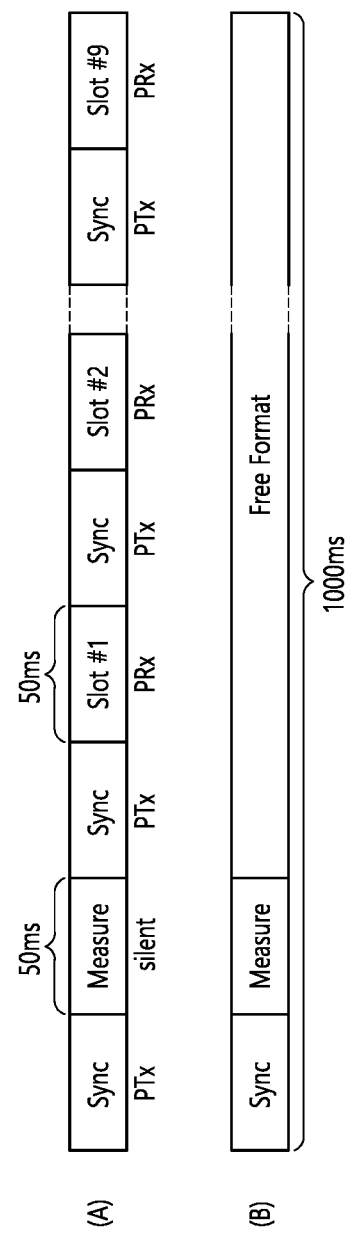
FIG. 9 illustrates a communication frame structure according to one embodiment.

FIG. 9 illustrates a communication frame structure according to one embodiment. This frame structure may be a communication frame structure in the shared mode.

Referring to FIG. 9, in the shared mode, different types of frames may be used together. For example, in the shared mode, a slotted frame having a plurality of slots as shown in (A) and a free format frame without a specific frame as shown in (B) may be used. More specifically, the slotted frame is intended for a wireless power receiver 200 to transmit short data packets to a wireless power transmitter 100, and the free format frame does not have a plurality of slots, thereby allowing transmission of long data packets.

Meanwhile, the slotted frame and free format frame may be changed to various names by those skilled in the art. For example, the slotted frame may be called a channel frame, and the free format frame may be called a message frame.

More specifically, the slotted frame may include a sync pattern indicating the start of a slot, measurement slot, nine slots, and an additional sync pattern having the same time interval before each of the nine slots.

Here, the additional sync pattern is different from the sync pattern indicating the start of the frame described above. More specifically, the additional sync pattern does not indicate the start of the frame but shows information related to adjacent slots (namely, two consecutive slots placed at both sides of the sync pattern).

A sync pattern may be located between any two consecutive slots of the nine slots. In this case, the sync pattern may provide information related to the two consecutive slots.

Also, the nine slots and sync patterns provided before the respective nine slots may have the same time interval. For example, the nine slots may have a time interval of 50 ms. Also, the nine sync patterns may have a time length of 50 ms.

Meanwhile, the free format frame as shown in (B) may not have a specific form except for the sync pattern indicating the start of the frame and the measurement slot. In other words, the free format frame is intended to perform a role different from that of the slotted frame; for example, the free format frame may be used for performing communication of long data packets (for example, additional owner information packets) between a wireless power transmitter and a wireless power receiver or for selecting any one from among a plurality of coils in a wireless power transmitter composed of the plurality of coils.

In what follows, a sync pattern included in each frame will be described in more detail with reference to a related figure.

FIG. 10 illustrates a structure of a sync pattern according to one embodiment.

Referring to FIG. 10, a sync pattern may be composed of a preamble, start bit, response field, type field, info field, and parity bit. In FIG. 10, the start bit is set to ZERO.

More specifically, a preamble is composed of consecutive bits which may all be set to 0s. In other words, the preamble may be composed of bits to conform to the time length of a sync pattern.

The number of bits constituting the preamble may depend on the operating frequency in a way that the length of the sync pattern is closest to 50 ms but does not exceed 50 ms. For example, if the operating frequency is 100 kHz, the sync pattern may comprise two preamble bits while, if the operating frequency is 105 kHz, the sync pattern may comprise three preamble bits.

The start bit is a bit following the preamble and may be set to ZERO. The ZERO may be a bit indicating the type of the sync pattern. Here, the type of sync pattern may include a frame sync including information related to the frame and a slot sync including information about the slot. In other words, the sync pattern may be a frame sync which is located between consecutive frames and indicates the start of the frame or a slot sync which is located between consecutive slots among a plurality of slots constituting the frame and includes information related to the consecutive slots.

For example, if the ZERO is 0, it indicates a slot sync where the corresponding sync is located between slots while, if the ZERO is 1, it indicates a frame sync where the corresponding sync pattern is located between frames.

The parity bit is the last bit of the sync pattern and indicates the number of bits constituting data fields (namely, response field, type field, and information field) of the sync pattern. For example, the parity bit is 1 when the number of bits constituting data fields of the sync pattern is even and 0, otherwise (namely, when it is odd).

The response field may include response information of a wireless power transmitter with respect to communication with a wireless power receiver within the slot before the sync pattern. For example, the response field may be '00' if communication with the wireless power receiver is not detected. Similarly, the response field may be '01' if a communication error is detected in communication with the wireless power receiver. The communication error may indicate a case in which two or more wireless power receivers attempt to approach one slot and two or more wireless power receivers collide with each other.

Also, the response field may include information indicating whether a data packet has been received correctly from the wireless power receiver. More specifically, the response field may be "10" (10-not acknowledge (NAK)) when the wireless power transmitter denies a data packet while it may be "11" (11-acknowledge (ACK)) when the wireless power transmitter confirms the data packet.

The type field may indicate the type of a sync pattern. More specifically, the type field may be '1' to indicate a frame sync if the sync pattern is the first sync pattern of a frame (namely, the first sync pattern of the frame when the sync pattern is located before the measurement slot).

Also, the type field may be '0' to indicate a slot sync if the sync pattern is not the first sync pattern of the frame.

Also, the meaning of the information field may be determined according to the type of sync pattern indicated by the type field. For example, if the type field is 1 (namely in the case of frame sync), the meaning of the info field may indicate the type of a frame. In other words, the info field may indicate whether a current frame is a slotted frame or free-format frame. For example, if the info field is '00', it may indicate a slotted frame while, if the info field is '01', it may indicate a free-format frame.

Unlike the above, if the type field is 0 (namely in the case of slot sync), the info field may indicate the state of the next slot located behind the sync pattern. More specifically, the info field is '00' if the next slot is a slot allocated to a specific wireless power receiver; '01' if the next slot is a slot locked to be used temporarily by a specific wireless power receiver; or '10' if the next slot is a slot freely available for an arbitrary wireless power receiver.

Figure 11:
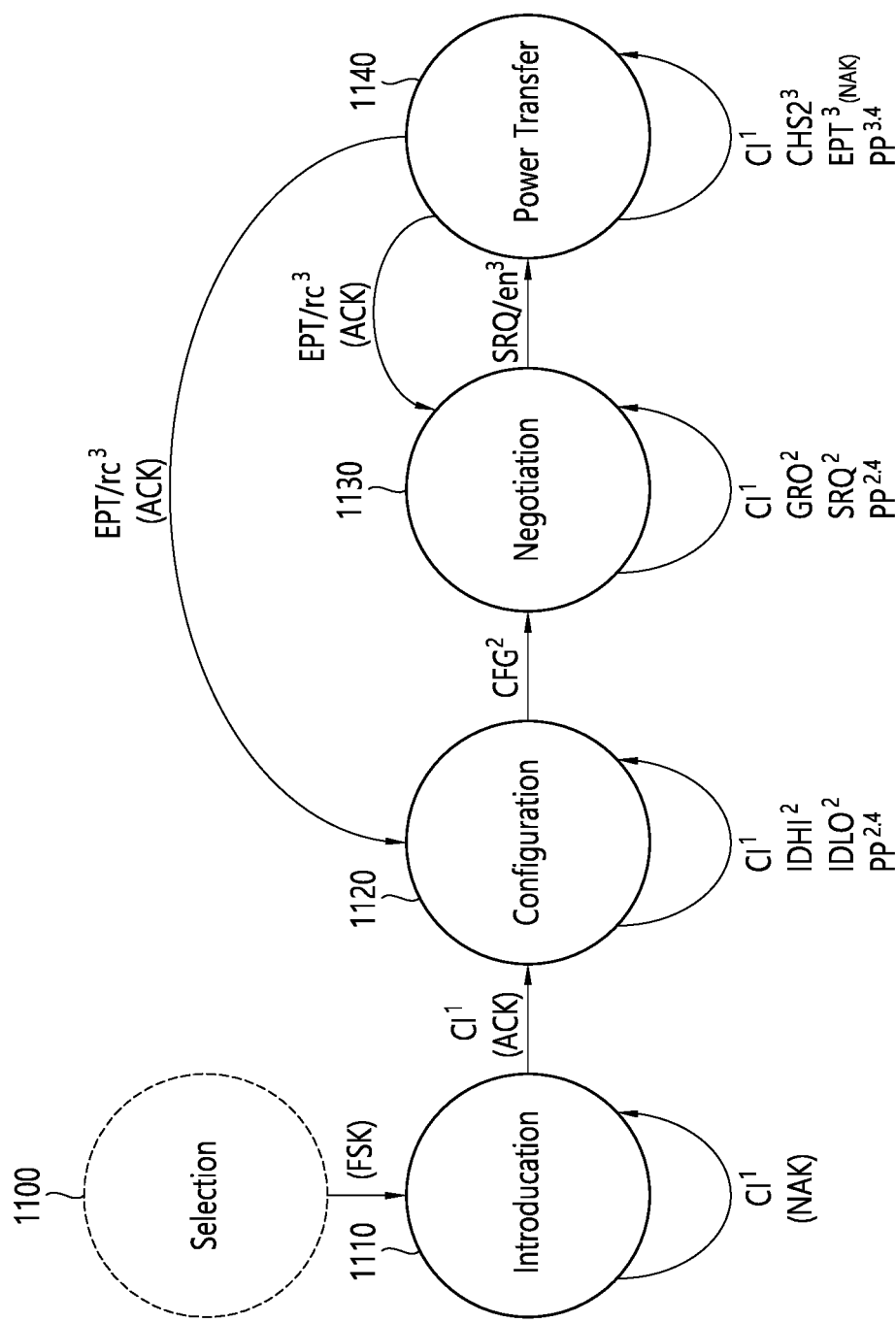
FIG. 11 illustrates operation states of a wireless power transmitter and a wireless power receiver in a shared mode according to one embodiment.

FIG. 11 illustrates operation states of a wireless power transmitter and a wireless power receiver in a shared mode according to one embodiment.

Referring to FIG. 11, a wireless power receiver operating in the shared mode may operate in one of selection phase 1100, introduction phase 1110, configuration phase 1120, negotiation phase 1130, and power transfer phase 1140.

First, a wireless power transmitter according to one embodiment may transmit a wireless power signal to detect a wireless power receiver. In other words, a process of detecting a wireless power receiver by using a wireless power signal may be called analog ping.

Meanwhile, the wireless power receiver which has received a wireless power signal may enter the selection phase 1100. The wireless power receiver which has entered the selection phase 1100 may detect existence of an FSK signal on the wireless power signal as described above.

In other words, the wireless power receiver may perform communication via either exclusive mode or shared mode depending on existence of the FSK signal.

More specifically, the wireless power receiver may operate in the shared mode if an FSK signal is included in a wireless power signal and otherwise operate in the exclusive mode.

If the wireless power receiver operates in the shared mode, the wireless power receiver may enter the introduction phase 1110. In the introduction phase 1110, the wireless power receiver may transmit a control information (CI) packet to the wireless power transmitter to transmit the CI packet in the configuration phase, negotiation phase, and power transfer phase. The control information packet may have a header and information related to control. For example, the header of the control information packet may be 0X53.

In the introduction state 1110, the wireless power receiver performs an attempt for requesting a free slot to transmit a CI packet throughout the subsequent configuration, negotiation, and power transfer phase. At this time, the wireless power receiver selects a free slot and transmits an initial CI packet. If the wireless power transmitter responds to the corresponding CI with ACK, the wireless power transmitter enters the configuration phase. If the wireless power transmitter responds with NACK, it indicates that other wireless power receiver is under progress through the configuration and negotiation phase. In this case, the wireless power receiver re-attempts to request a free slot.

If the wireless power receiver receives ACK as a response to the CI packet, the wireless power receiver determines the location of a private slot within the frame by counting the remaining slot syncs up to the initial frame sync. In all subsequent slot based frames, the wireless power receiver transmits the CI packet through the corresponding slot.

If the wireless power transmitter allows the wireless power receiver to proceed to the configuration phase, the wireless power transmitter provides a locked slot series for an exclusive use of the wireless power receiver. This ensures that the wireless power receive proceed to the configuration phase without collision.

The wireless power receiver transmits sequences of data packets such as two identification data packets (IDHI and IDLO) by using a locked slot. After completing the present phase, the wireless power receiver enters the negotiation phase. In the negotiation phase, the wireless power transmitter continues to provide a locked slot to the wireless power receiver for an exclusive use. This ensures that the wireless power receiver proceeds the negotiation phase without collision.

The wireless power receiver may transmit one or more negotiation data packets by using the corresponding locked slot, which may be mixed with private data packets. As a result, the corresponding sequence is terminated together with a specific request (SRQ) packet. If the corresponding sequence is completed, the wireless power receiver enters the power transfer phase, and the wireless power transmitter stops providing a locked slot.

In the power transfer state, the wireless power receiver performs transmission of a CI packet and receives power by using an allocated slot. The wireless power receiver may include a regulator circuit. The regulator circuit may be included in the communication & control unit. The wireless power receiver may self-regulate the reflected impedance of the wireless power receiver through the regulator circuit. In other words, the wireless power receiver may adjust reflected impedance to transmit the amount of power requested by an external load. This may prevent reception of excessive power and overheating.

In the shared mode, since the wireless power transmitter may not perform adjusting power in response to a received CI packet (depending on the operating mode), control may be necessary to prevent an overvoltage state.

In a wireless power transmission system, in general, amplitude shift keying (ASK) using a magnetic field change or frequency shift keying (FSK) using a frequency change is used for communication between a wireless power transmission apparatus and a wireless power reception apparatus. However, ASK and FSK are not suitable for middle power class transmission or the transmission of a large amount of data in processes such as authentication, which is necessary for an advanced wireless power transmission system, because ASK and FSK communications have a transmission speed of only several kHz and are vulnerable to electrical/magnetic disturbance. In particular, an FSK method used for communication from the wireless power transmission apparatus to the wireless power reception apparatus has limitations in covering the number of increasing packets because the FSK method provides a speed of about 200 bps or less in an operating frequency of 100 KHz. Accordingly, in order to cover various applications for wireless power transmission, there is a need for a wireless power transmission apparatus, reception apparatus, and method supporting an improved communication speed.

The wireless power transmission apparatus may change an operating frequency between a first operating frequency (fmod) in a modulated state and a second operating frequency (fop) in an unmodulated state. To indicate whether a difference value between the first operating frequency and the second operating frequency is a negative number or a positive number is called a polarity. The size of a difference value between the first operating frequency and the second operating frequency is called depth. The polarity and the depth are FSK parameters necessary for FSK communication.

Figure 12:
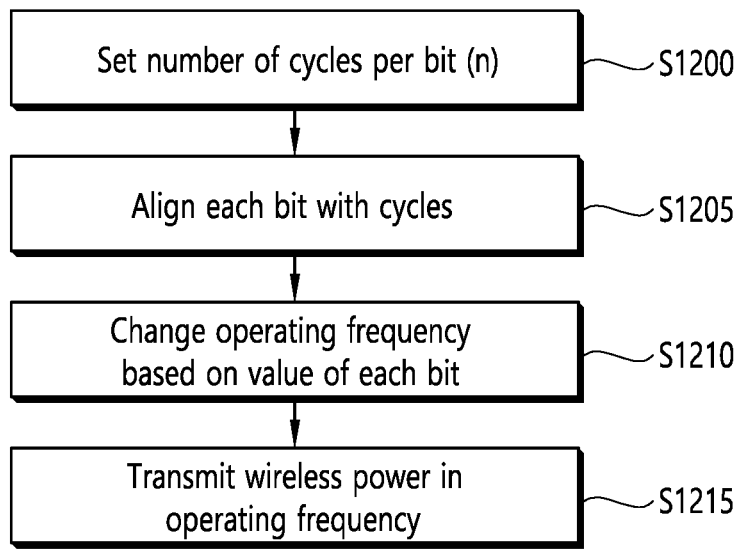
FIG. 12 is a flowchart illustrating a data and wireless power transmission method by a wireless power transmission apparatus according to an embodiment.
Figure 13:
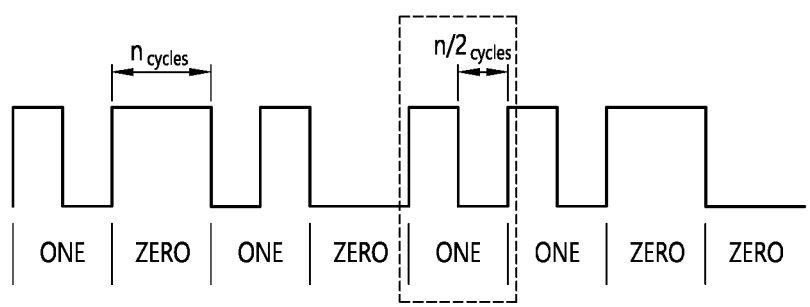
FIG. 13 is a diagram illustrating a process of encoding, by a wireless power transmission apparatus, data based on FSK.

FIG. 12 is a flowchart illustrating a data and wireless power transmission method by a wireless power transmission apparatus according to an embodiment. FIG. 13 is a diagram illustrating a process of encoding, by the wireless power transmission apparatus, data based on FSK.

Referring to FIG. 12, the wireless power transmission apparatus sets the number of cycles (i.e., the number of cycles per bit) (n) used to transmit one bit in an operating frequency (S1200).

The operating frequency may be indicated as repeated cycles in a time axis. As described above, the number of cycles used to transmit one bit in the operating frequency is called the number of cycles per bit. For example, n=512 means that 512 cycles are used to transmit one bit. In this case, the wireless power transmission apparatus may align each bit to be transmitted to a wireless power reception apparatus with 512 cycles of the operating frequency, and may modulate and/or encode continuous data bits.

According to the present embodiment, the wireless power transmission apparatus and/or the wireless power reception apparatus may variably set or determine the number of cycles per bit. For example, the number of cycles per bit may be variously set like the number of cycles per bit (n)=512, 256, 128, 64, 32, 16, 8, . . . . If the number of cycles per bit is configured to be variously set as described above, the transmission speed of FSK data may be increased or decreased. For example, if n=512 and an operating frequency is 100 KHz, an FSK communication speed is 100 (KHz)/512 (bit/cycle)=0.195 kb/s. However, if n=128 and an operating frequency is 100 KHz, an FSK communication speed is 100 (KHz)/256 (bit/cycle)=0.391 kb/s. That is, the communication speed may be doubled. The reason for this is that as the number of cycles per bit is decreased, a larger number of bits for the same cycles may be transmitted. As described above, the FSK modulation method of varying the number of cycles per bit provides flexibility in an improved data transmission speed and communication control compared to the FSK modulation method of operating a fixed number of cycles per bit.

As a result, from a modulation viewpoint, the number of cycles per bit may be called a modulation level or a modulation length because it is related to a communication speed. A high modulation level may mean that the number of cycles per bit is large. A low modulation level may mean that the number of cycles per bit is small. For example, if a modulation level is indicated as 0 to 5, a correspondence relation between modulation levels and the number of cycles per bit is illustrated in Table 3.

TABLE 3

| Modulation level | Number of cycles per bit |
|---|---|
| 0 (default) | 512 |
| 1 | 256 |
| 2 | 128 |
| 3 | 64 |
| 4 | 32 |
| 5 | 16 |

In Table 3, the modulation level 0 may be set as a default modulation level. For example, the default modulation level is defined as a basic modulation level used in a situation in which FSK transmission having high reliability is necessary (e.g., a situation in which a communication error occurs, FOD detection or an initial setup step). Accordingly, if high speed transmission is necessary, a modulation level higher than the default modulation level may be used. However, this may be more vulnerable to channel degradation as the modulation level becomes higher because one bit is indicated as a smaller number of cycles. Therefore, a modulation level needs to be adaptively changed depending on communication channel quality between the wireless power transmission apparatus and the wireless power reception apparatus.

A modulation level according to the present embodiment may be adaptively changed, set, and applied in various situations. For example, the modulation level (or the number of cycles per bit) may be changed step by step. That is, the modulation level may be changed from 0(512) to 1(256), from 1(256) to 2(128), or from 2(128) to 3(64). Alternatively, the modulation level may be changed from 0(512) to 2(128) or may be changed from 3(64) to 0(512). Furthermore, the diversification, change, or adaptive setting of the modulation level may be dependent on encoding performance of a wireless power transmission apparatus and/or decoding performance of a wireless power reception apparatus. For example, although a wireless power transmission apparatus supports a variable modulation level, a wireless power reception apparatus may not support the variable modulation level.

A change, a determination, setting, etc. of a modulation level according to the present embodiment may be performed in the portion of a wireless power transmission process. For example, a change, a determination, setting, etc. of a modulation level may be performed in a negotiation phase, a power transfer phase and/or a renegotiation phase.

When the number of cycles per bit (n) according to a modulation level is determined (or set), the wireless power transmission apparatus aligns each bit of data with n cycles (S1205).

For example, referring to FIG. 13, the wireless power transmission apparatus aligns each of bits (1, 0, 1, 0, 1, 1, 0, 0, . . . ) of data with the cycles of an operating frequency for transmitting the data. That is, FIG. 13 illustrates that n cycles are used to transmit each bit in the operating frequency.

The wireless power transmission apparatus changes the operating frequency between differential bi-phases based on a value of each bit during the n cycles (S1210). This may correspond to the FSK modulation method. In this case, the differential bi-phases include the $1^{st}$ phase and $2^{nd}$ phase of the operating frequency that are different from each other. That is, the operating frequency may transition from the $1^{st}$ phase to the $2^{nd}$ phase or may transition from the $2^{nd}$ phase to the $1^{st}$ phase. In this case, the $1^{st}$ phase may be a modulated state, and the $2^{nd}$ phase may be an unmodulated state. Alternatively, on the contrary, the $1^{st}$ phase may be an unmodulated state, and the $2^{nd}$ phase may be a modulated state.

A transition to an operating frequency having a phase different from a previous phase may occur in cycles in which a new bit starts. For example, in FIG. 13, when a dotted-line box portion is viewed, in the case of a bit value 1, the operating frequency transitions from the $1^{st}$ phase (low state) to the $2^{nd}$ phase (high state) in a start cycle, and transitions from the $2^{nd}$ phase to the $1^{st}$ phase at an n/2 cycle point. That is, when the bit value is 1, two operating frequency phase transitions may occur during n cycles. In contrast, in the case of a bit value 0, the operating frequency transitions only once within n cycles. Two operating frequency phase transitions during n cycles are mapped on or correspond to the bit value 1. One operating frequency phase transition during n cycles is mapped on or corresponds to the bit value 0.

Accordingly, the wireless power transmission apparatus may encode a bit value 1 by using two phase transitions during n cycles of an operating frequency, and may encode a bit value 0 by using one phase transition during n cycles of the operating frequency. In contrast, the wireless power reception apparatus may decode the bit value 1 when detecting two phase transitions during the n cycles of the operating frequency, and may decode the bit value 0 when detecting one phase transition during the n cycles of the operating frequency.

The wireless power transmission apparatus transmits wireless power to the wireless power reception apparatus based on magnetic coupling in the transitioned operating frequency (S1215). FSK data is already included in the phase in which the operating frequency transitions. Accordingly, when the wireless power is transmitted in such an operating frequency, the wireless power reception apparatus may receive the FSK data along with the wireless power. This is called inband communication.

The wireless power transmission apparatus of FIGS. 12 and 13 according to an embodiment may correspond to the wireless power transmission apparatus or the wireless power transmitter or the power transmission unit disclosed in FIGS. 1 to 11. Accordingly, the operation of the wireless power transmission apparatus in the present embodiment is implemented by one or a combination of two or more of the components of the wireless power transmission apparatus of FIGS. 1 to 11. For example, in the present embodiment, the operation of setting the number of cycles per bit (n) in step S1200, the operation of aligning each bit with cycles in step S1205, and the operation of transitioning the operating frequency in step S1210 may be performed by the communication/control unit 120. The operation of transmitting wireless power in the operating frequency in step S1215 may be performed by the power conversion unit 110.

Figure 14:
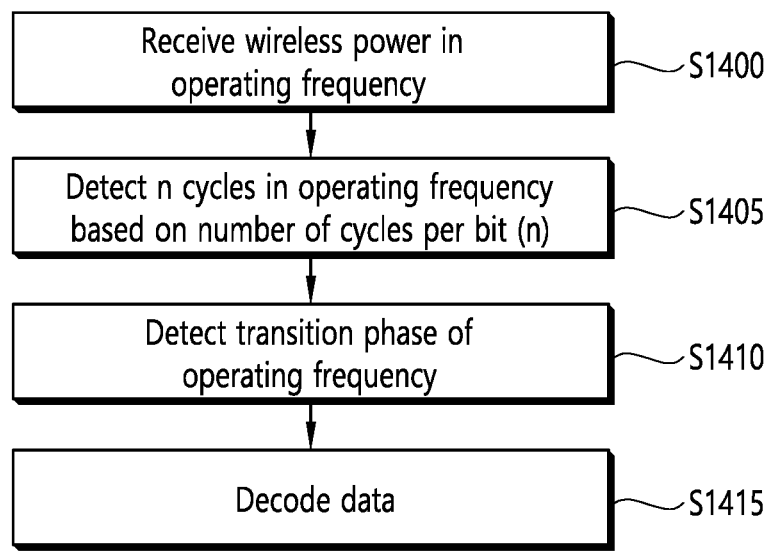
FIG. 14 is a flowchart illustrating a data and wireless power reception method by a wireless power reception apparatus according to an embodiment.

FIG. 14 is a flowchart illustrating a data and wireless power reception method by a wireless power reception apparatus according to an embodiment.

Referring to FIG. 14, the wireless power reception apparatus receives wireless power in an operating frequency from a wireless power transmission apparatus (S1400).

The wireless power reception apparatus detects n cycles aligned with each bit in the operating frequency based on a preset or indicated number of cycles per bit (n) (S1405). In this case, the number of cycles per bit (n) may be previously determined by the wireless power transmission apparatus or may be previously determined by the wireless power reception apparatus. The wireless power reception apparatus detects a series of bits every n cycles.

The wireless power reception apparatus detects a transition phase of the operating frequency during n cycles (S1410). The transition phase of the operating frequency during the n cycles provides information on a value of a bit corresponding to corresponding n cycles. This is the same as that described with reference to FIGS. 12 and 13.

The wireless power reception apparatus decodes the data received from the wireless power transmission apparatus based on the transition phase of the frequency (S1415).

The wireless power reception apparatus of FIG. 14 according to an embodiment may correspond to the wireless power reception apparatus or the wireless power receiver or the power reception unit disclosed in FIGS. 1 to 11. Accordingly, the operation of the wireless power reception apparatus in the present embodiment is implemented by one or a combination of two or more of the components of the wireless power reception apparatus in FIGS. 1 to 11. For example, in the present embodiment, the operation of receiving wireless power in the operating frequency in step S1400 may be performed by the power pickup unit 210. Furthermore, in the present embodiment, the operation of detecting n cycles in the operating frequency based on the number of cycles per bit (n) in step S1405, the operating of detecting the transition phase of the operating frequency in step S1410, the operation of decoding the data in step S1415, etc. may be performed by the communication/control unit 220.

Hereinafter, a method of indicating whether a wireless power transmission apparatus and a wireless power reception apparatus support a variable communication speed is disclosed. The meaning that the variable communication speed is supported may mean that a modulation level is variable and may mean that the number of cycles per bit is variable. The wireless power transmission apparatus or the wireless power reception apparatus may support the variable communication speed or may not support the variable communication speed depending on a standard version or a manufacturer.

Whether the wireless power reception apparatus supports the variable communication speed may be indicated or signaled by a modulation level (ML) flag included in a configuration packet. The configuration packet may be transmitted from the wireless power reception apparatus to the wireless power transmission apparatus in an identification and configuration step. Whether the wireless power transmission apparatus supports the variable communication speed may be indicated or signaled by a modulation level (ML) flag included in the capability packet of the wireless power transmission apparatus. The capability packet of the wireless power transmission apparatus may be transmitted from the wireless power transmission apparatus to the wireless power reception apparatus in the negotiation phase.

For example, in the configuration packet and the capability packet of the wireless power transmission apparatus, the ML flag is 1 bit. When a value of the ML flag is 1, this may indicate that the wireless power transmission apparatus or the wireless power reception apparatus supports a variable modulation level, that is, a variable communication speed. When a value of the ML flag is 0, this may indicate that the wireless power transmission apparatus or the wireless power reception apparatus does not support the variable communication speed. If at least one of the wireless power transmission apparatus and the wireless power reception apparatus does not support the variable modulation level, the number of cycles per bit may be fixed to 256 or 512, for example.

Hereinafter, a process of adaptively changing a communication speed is disclosed.

Figure 15:
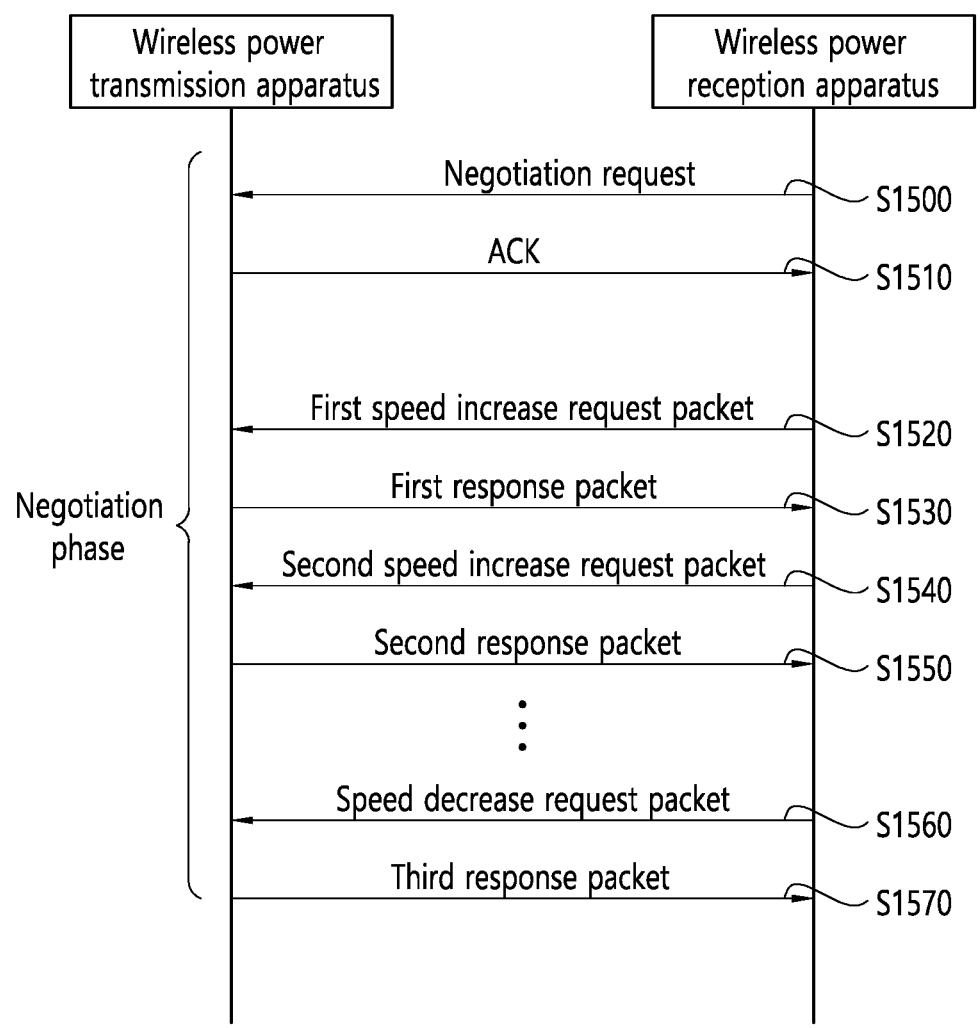
FIG. 15 is a flowchart illustrating a process of changing a communication speed according to an embodiment.

FIG. 15 is a flowchart illustrating a process of changing a communication speed according to an embodiment.

Referring to FIG. 15, a wireless power reception apparatus transmits, to a wireless power transmission apparatus, a negotiation request related to the transmission of wireless power (S1500). For example, the wireless power reception apparatus may set a value of a negotiation field of a configuration packet to "1" in the identification and configuration step, and may transmit the negotiation request to the wireless power transmission apparatus.

When the wireless power transmission apparatus transmits ACK as a response to the negotiation request of the wireless power reception apparatus (S1510), the wireless power transmission apparatus and the wireless power reception apparatus enter a negotiation phase. In this case, ACK is generated based on a default modulation level and transmitted to the wireless power reception apparatus in the form of a data packet. That is, a response packet for the negotiation request is transmitted at a default communication speed. In this case, data to be transmitted by the wireless power transmission apparatus is transmitted to the wireless power reception apparatus according to FSK as a response to the request of the wireless power reception apparatus. Accordingly, the data packet may be defined as a response pattern, a response signal, or a response packet.

When receiving the ACK normally from the wireless power transmission apparatus, the wireless power reception apparatus enters the negotiation phase and transmits, to the wireless power transmission apparatus, a first speed increase request packet that requests or indicates an increase in the communication speed of the wireless power transmission apparatus (S1520). When receiving the first speed increase request packet from the wireless power reception apparatus, the wireless power transmission apparatus transmits a first response packet for the first speed increase request packet to the wireless power reception apparatus at a communication speed increased by increasing a modulation level (S1530).

For example, when receiving the first speed increase request packet, the wireless power transmission apparatus may increase an FSK communication speed by resetting the modulation level from "0" to "1" and changing the number of cycles per bit from 512 to 256.

When receiving the first response packet, the wireless power reception apparatus determines whether a reception error occurs by decoding the first response packet. If the first response packet is received normally, the wireless power reception apparatus transmits a second speed increase request packet to the wireless power transmission apparatus (S1540). When receiving the second speed increase request packet from the wireless power reception apparatus, the wireless power transmission apparatus transmits a second response packet for the second speed increase request packet to the wireless power reception apparatus at a communication speed further increased by further increasing the modulation level (S1550). For example, when receiving the second speed increase request packet, the wireless power transmission apparatus may further increase the FSK communication speed by resetting the modulation level from "1" to "2" and changing the number of cycles per bit from 256 to 128. Such a speed increase procedure may be repeatedly performed until the wireless power reception apparatus fails in the decoding of the response packet received from the wireless power transmission apparatus.

When determining that an error has occurred in the reception of a specific response packet, the wireless power reception apparatus transmits a speed decrease request packet to the wireless power transmission apparatus (S1560). When receiving the speed decrease request packet from the wireless power reception apparatus, the wireless power transmission apparatus transmits a third response packet for the speed decrease request packet to the wireless power reception apparatus at a communication speed decreased by decreasing the modulation level (S1570). For example, when receiving the speed decrease request packet, the wireless power transmission apparatus may decrease the FSK communication speed by resetting the modulation level from "2" to "1" and changing the number of cycles per bit from 128 to 256.

When determining that the third response packet has been successfully received, the wireless power reception apparatus may terminate the negotiation phase and enter the power transfer phase. The wireless power transmission apparatus can communicate with the wireless power reception apparatus at an optimal speed because it can set a modulation level as an optimal number of cycles per bit through such a process.

The wireless power transmission apparatus of FIG. 15 according to an embodiment may correspond to the wireless power transmission apparatus or the wireless power transmitter or the power transmission unit disclosed in FIGS. 1 to 11. Accordingly, the operation of the wireless power transmission apparatus in the present embodiment is implemented by one or a combination of two or more of the components of the wireless power transmission apparatus in FIGS. 1 to 11. For example, in the present embodiment, the operation of the wireless power transmission apparatus according to step S1500 to step S1570 may be performed by the communication/control unit 120.

Meanwhile, the wireless power reception apparatus of FIG. 15 according to an embodiment may correspond to the wireless power reception apparatus or the wireless power receiver or the power reception unit disclosed in FIGS. 1 to 11. Accordingly, the operation of the wireless power reception apparatus in the present embodiment is implemented by one or a combination of two or more of the components of the wireless power reception apparatus in FIGS. 1 to 11. For example, in the present embodiment, the operation of the wireless power reception apparatus according to step S1500 to step S1570 may be performed by the communication/control unit 220.

Figure 16:
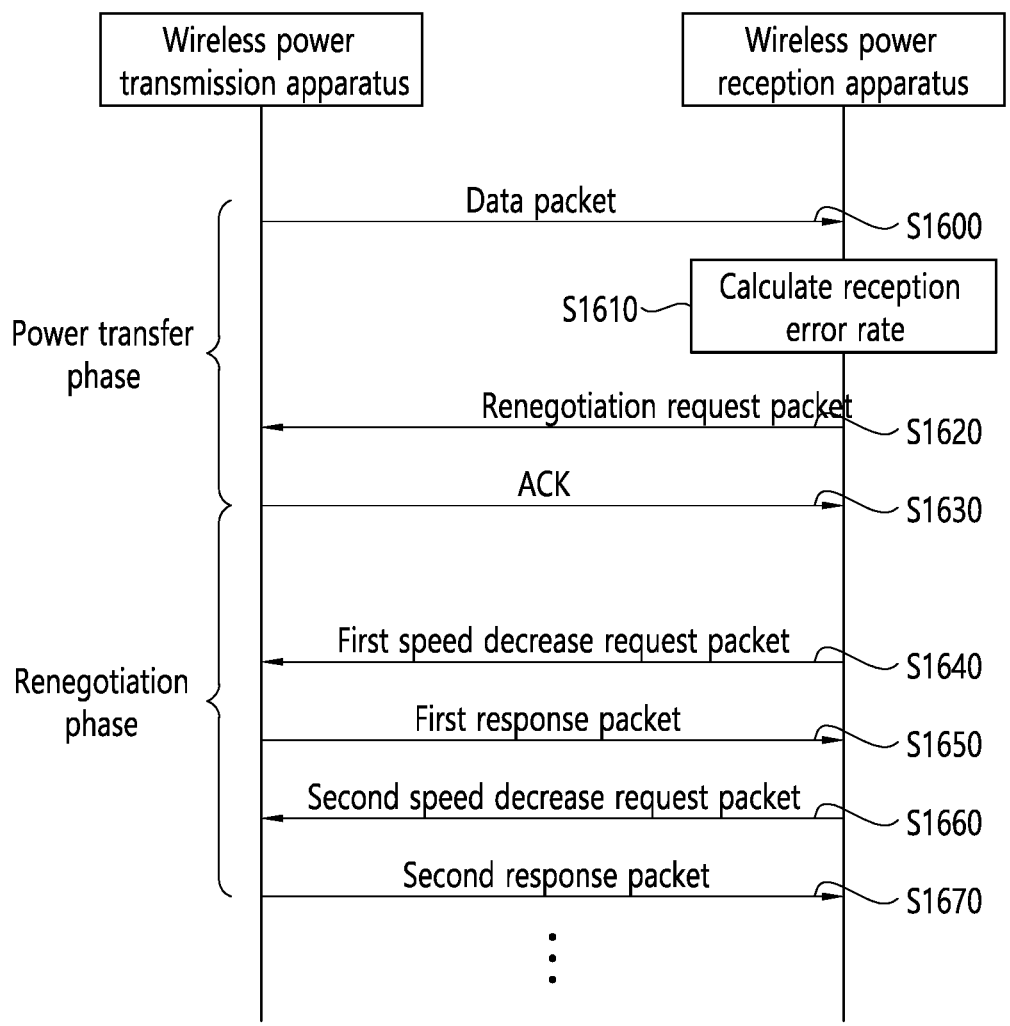
FIG. 16 is a flowchart illustrating a process of changing a communication speed according to another embodiment.
Figure 17:
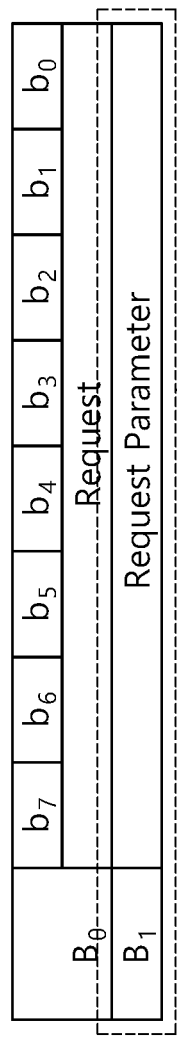
FIG. 17 is the structure of a specific request packet according to an embodiment.
Figure 17:
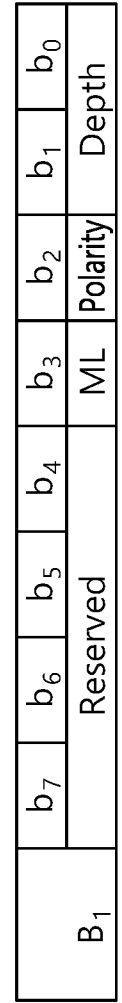

FIG. 16 is a flowchart illustrating a process of changing a communication speed according to another embodiment. FIG. 17 is the structure of a specific request packet according to an embodiment.

Referring to FIG. 16, in a power transfer phase, a wireless power reception apparatus receives at least one data packet from a wireless power transmission apparatus (S1600). In this case, the at least one data packet may be response information of the wireless power transmission apparatus for a received power packet (RPP) transmitted from the wireless power reception apparatus to the wireless power transmission apparatus. The response information may be a bit pattern such as ACK or NACK. That is, the data packet in step S1600 may be substituted with at least one piece of response information.

The wireless power reception apparatus calculates a reception error rate (or a reception success rate) of FSK data received from the wireless power transmission apparatus by decoding the data packet received from the wireless power transmission apparatus (S1610). The reception error rate may be calculated based on a decoding success number and decoding failure number of the FSK data transmitted by the wireless power transmission apparatus. For example, the reception error rate may be calculated according to Equation 1 below.

Reception error rate (%)=the number of packets having checksum error among received packets/a total number of received packets*100  [Equation 1]

If the reception error rate of the FSK data transmitted by the wireless power transmission apparatus is higher than a threshold or the reception error rate having a given level or more continues, the wireless power reception apparatus transmits a renegotiation request packet to the wireless power transmission apparatus for a change in an FSK communication speed (S1620).

When receiving the renegotiation request packet from the wireless power reception apparatus, the wireless power transmission apparatus transmits ACK as a response thereto, and may enter a renegotiation phase (S1630).

When receiving the ACK normally from the wireless power transmission apparatus, the wireless power reception apparatus enters the renegotiation phase, and transmits, to the wireless power transmission apparatus, a first speed decrease request packet that requests or indicates a decrease in the communication speed of the wireless power transmission apparatus (S1640). When receiving the first speed decrease request packet from the wireless power reception apparatus, the wireless power transmission apparatus transmits a first response packet for the first speed decrease request packet to the wireless power reception apparatus at a communication speed decreased by decreasing a modulation level (S1650). For example, when receiving the first speed increase request packet, the wireless power transmission apparatus may decrease an FSK communication speed by resetting a modulation level from "3" to "2" and changing the number of cycles per bit from 128 to 256.

When receiving the first response packet, the wireless power reception apparatus determines whether a reception error has occurred by decoding the first response packet. If an error has occurred in the first response packet, the wireless power reception apparatus transmits a second speed decrease request packet to the wireless power transmission apparatus (S1660). When receiving the second speed decrease request packet from the wireless power reception apparatus, the wireless power transmission apparatus transmits a second response packet for the second speed decrease request packet to the wireless power reception apparatus at a communication speed further decreased by further decreasing the modulation level (S1670). For example, when receiving the second speed decrease request packet, the wireless power transmission apparatus may further decrease the FSK communication speed by resetting the modulation level from "2" to "1" and changing the number of cycles per bit from 256 to 512. Such a speed decrease procedure may be repeatedly performed until the wireless power reception apparatus succeeds in the decoding of the response packet received from the wireless power transmission apparatus. When determining that the response packet from the wireless power transmission apparatus has been successfully received, the wireless power reception apparatus may terminate the renegotiation phase and enter a power transfer phase.

Meanwhile, if a reception error rate of the FSK data transmitted by the wireless power transmission apparatus is a threshold or less or the reception error rate of less than a given level continues, the wireless power reception apparatus may transmit the wireless power transmission apparatus to a renegotiation request packet in order to increase the FSK communication speed. In this case, the speed increase procedure of the FSK communication speed may be performed similarly to the speed increase procedure in FIG. 15.

In the present embodiment, the wireless power reception apparatus may transmit, to the wireless power transmission apparatus, a specific request packet having a structure of FIG. 17 as a packet for an increase request or decrease request for the FSK communication speed.

Referring to FIG. 17, the specific request packet includes a request field B0 of 1 byte and a request parameter field B1 of 1 byte. The request field indicates various matters to be requested from the wireless power transmission apparatus as shown in Table 4.

TABLE 4

| Request | Description | Request Parameter |
| --- | --- | --- |
| 0x00 | End Negotiation | Change count |
| 0x01 | Guaranteed Power | Guaranteed Power Value |
| 0x02 | Received Power Packet Type | Received Power Packet Header |
| 0x03 | FSK Parameters | Polarity and depth |
| 0x04 | Maximum Power | Maximum Power Value |
| 0x05 to 0xEF | Reserved | N.A. |
| 0xF0 to 0xFF | Proprietary | Proprietary |

Referring to Table 4, when a value of the request field is 0x03, this indicates that a corresponding request is related to an FSK parameter. In this case, the request parameter field of the request packet includes an FSK parameter field. The request parameter field includes a reserved field, a modulation level (ML) field, a polarity field, and a depth field. For example, the ML field is 1 bit as in FIG. 17. The ML field may be set to 1 if an increase of an FSK communication speed is requested, and may be set to 0 if a decrease of an FSK communication speed is requested. Moreover, for example, the ML field is 3 bits, and a value thereof may indicate a modulation level such as Table 3. For example, the ML field may indicate n=512 (default) when a value of the ML field is 000b, may indicate n=256 when a value of the ML field is 001b, may indicate n=128 when a value of the ML field is 010b, may indicate n=64 when a value of the ML field is 011b, may indicate n=32 when a value of the ML field is 100b, and may indicate n=16 when a value of the ML field is 101b.

The wireless power transmission apparatus of FIGS. 16 and 17 according to an embodiment may correspond to the wireless power transmission apparatus or the wireless power transmitter or the power transmission unit disclosed in FIGS. 1 to 11. Accordingly, the operation of the wireless power transmission apparatus in the present embodiment is implemented by one or a combination of two or more of the components of the wireless power transmission apparatus in FIGS. 1 to 11. For example, in the present embodiment, the operation of the wireless power transmission apparatus according to step S1600 to step S1670 may be performed by the communication/control unit 120.

Meanwhile, the wireless power reception apparatus of FIGS. 16 and 17 according to an embodiment may correspond to the wireless power reception apparatus or the wireless power receiver or the power reception unit disclosed in FIGS. 1 to 11. Accordingly, the operation of the wireless power reception apparatus in the present embodiment is implemented by one or a combination of two or more of the components of the wireless power reception apparatus in FIGS. 1 to 11. For example, in the present embodiment, the operation of the wireless power reception apparatus according to step S1600 to step S1670 may be performed by the communication/control unit 220.

Figure 18:
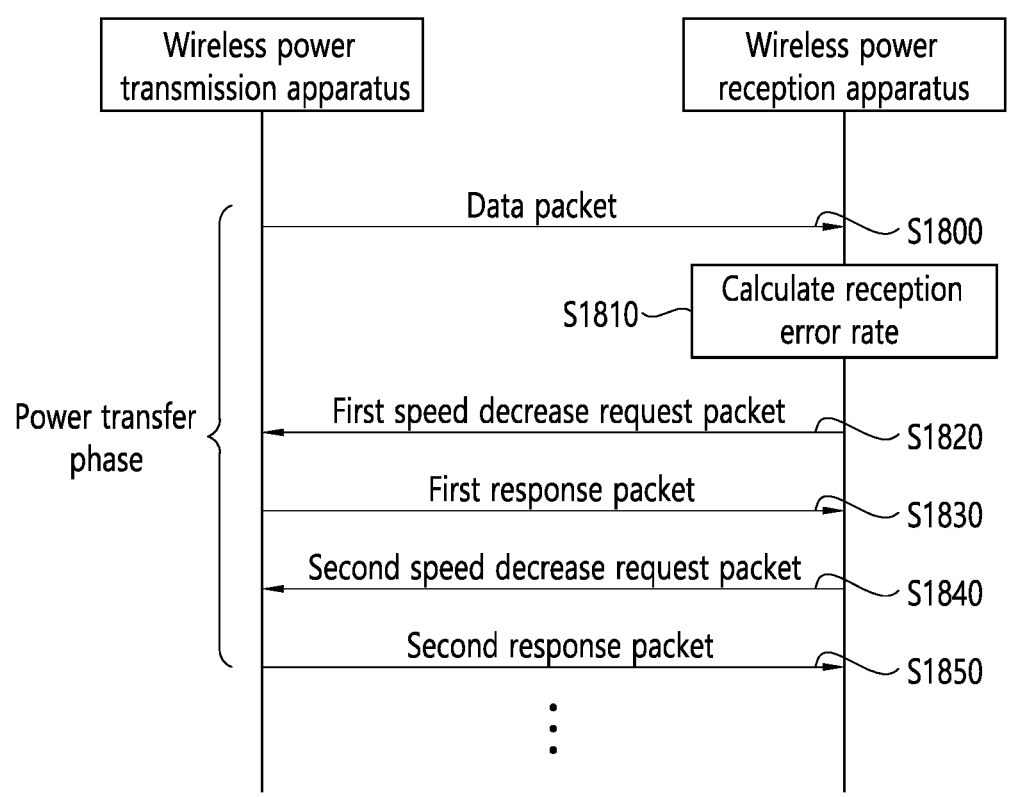
FIG. 18 is a flowchart illustrating a process of changing a communication speed according to still another embodiment.

FIG. 18 is a flowchart illustrating a process of changing a communication speed according to still another embodiment.

Referring to FIG. 18, in a power transfer phase, a wireless power reception apparatus receives at least one data packet from a wireless power transmission apparatus (S1800). In this case, the at least one data packet may be a response packet of the wireless power transmission apparatus for a received power packet (RPP) transmitted from the wireless power reception apparatus to the wireless power transmission apparatus. The response packet may be a bit pattern such as ACK or NACK.

The wireless power reception apparatus calculates a reception error rate (or a reception success rate) of FSK data transmitted by the wireless power transmission apparatus by decoding the data packet received from the wireless power transmission apparatus (S1810). The reception error rate may be calculated based on a decoding success number and decoding failure number of the FSK data transmitted by the wireless power transmission apparatus, and may be calculated according to Equation 1, for example.

When the reception error rate of the FSK data transmitted by the wireless power transmission apparatus is higher than a threshold or the reception error rate having a given level or more continues, the wireless power reception apparatus transmits a first speed decrease request packet to the wireless power transmission apparatus in order to decrease an FSK communication speed (S1620).

When receiving the first speed decrease request packet from the wireless power reception apparatus, the wireless power transmission apparatus transmits a first response packet for the first speed decrease request packet to the wireless power reception apparatus at a communication speed decreased by decreasing a modulation level (S1820). For example, when receiving the first speed increase request packet, the wireless power transmission apparatus may decrease the FSK communication speed by resetting the modulation level from "3" to "2" and changing the number of cycles per bit from 128 to 256.

When receiving the first response packet, the wireless power reception apparatus determines whether a reception error has occurred by decoding the first response packet. If an error has occurred in the first response packet, the wireless power reception apparatus transmits a second speed decrease request packet to the wireless power transmission apparatus (S1840). When receiving the second speed decrease request packet from the wireless power reception apparatus, the wireless power transmission apparatus transmits a second response packet for the second speed decrease request packet to the wireless power reception apparatus at a communication speed further decreased by further decreasing the modulation level (S1850). For example, when receiving the second speed decrease request packet, the wireless power transmission apparatus may further decrease the FSK communication speed by resetting the modulation level from "2" to "1" and changing the number of cycles per bit from 256 to 512. Such a speed decrease procedure may be repeatedly performed until the wireless power reception apparatus succeeds in the decoding of the response packet received from the wireless power transmission apparatus.

Meanwhile, if the reception error rate of the FSK data transmitted by the wireless power transmission apparatus is a threshold or less or the reception error rate of less than a given level continues, the wireless power reception apparatus may transmit a speed increase request packet to the wireless power transmission apparatus in order to increase the FSK communication speed. In this case, the speed increase procedure of the FSK communication speed may be performed similarly to the speed increase procedure of FIG. 15.

The wireless power transmission apparatus of FIG. 18 according to an embodiment may correspond to the wireless power transmission apparatus or the wireless power transmitter or the power transmission unit disclosed in FIGS. 1 to 11. Accordingly, the operation of the wireless power transmission apparatus in the present embodiment is implemented by one or a combination of two or more of the components of the wireless power transmission apparatus in FIGS. 1 to 11. For example, in the present embodiment, the operation of the wireless power transmission apparatus according to step S1800 to step S1850 may be performed by the communication/control unit 120.

Meanwhile, the wireless power reception apparatus of FIG. 18 according to an embodiment may correspond to the wireless power reception apparatus or the wireless power receiver or the power reception unit disclosed in FIGS. 1 to 11. Accordingly, the operation of the wireless power reception apparatus in the present embodiment is implemented by one or a combination of two or more of the components of the wireless power reception apparatus in FIGS. 1 to 11. For example, in the present embodiment, the operation of the wireless power reception apparatus according to step S1800 to step S1850 may be performed by the communication/control unit 220.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. A communication method of a wireless power transmission apparatus, comprising:
    transmitting at least one data packet to a wireless power reception apparatus;
    receiving, from the wireless power reception apparatus, a first request packet to request a change in a communication speed of the wireless power transmission apparatus,
    wherein the communication speed of the wireless power transmission apparatus is changed based on the first request packet and
    transmitting a first response packet for the first request packet to the wireless power reception apparatus,
    wherein a number of cycles per bit in an operating frequency for a transmission of wireless power is changed based on the first request packet
    wherein each bit of data is aligned with n cycles; and
    wherein the operating frequency between differential bi-phases is changed based on a value of each bit during the n cycles.

2. The communication method of claim 1, wherein transmitting the first response packet is performed in at least one of a negotiation phase, a power transfer phase, or a renegotiation phase related to a transmission of wireless power.

3. The communication method of claim 1, wherein the first request packet comprises a speed increase request packet including information for an increase in the communication speed and a speed decrease request packet including information for a decrease in the communication speed.

4. The communication method of claim 1, further comprising:
    after transmitting the first response packet at the changed communication speed,
    receiving, from the wireless power reception apparatus, a second request packet to request a change in the communication speed based on whether a reception error occurs in the first response packet; and
    increasing or decreasing the number of cycles per bit (n) by a preset number based on the second request packet.

5. The communication method of claim 1, further comprising receiving, from the wireless power reception apparatus, a renegotiation request packet for a change in the communication speed, after transmitting the at least one data packet.

6. A method for transferring a wireless power, the method performed by a wireless power transmitter and comprising:
    receiving, from a wireless power receiver, a configuration packet including information for a negotiation phase;
    transmitting, to the wireless power receiver, an acknowledge (ACK) in response to the configuration packet,
    wherein the ACK has 512 cycles per a bit,
    entering the negotiation phase with the wireless power receiver,
    wherein, in the negotiation phase or a power transfer phase, a number of cycles per bit in an operating frequency for transferring the wireless power is changed from the 512 cycles,
    wherein, in the negotiation phase or the power transfer phase, each bit of data is aligned with n cycles; and
    wherein, in the negotiation phase or the power transfer phase, the operating frequency between differential bi-phases is changed based on a value of each bit during the n cycles.

* * * * *